United States Patent
Uchiyama et al.

(10) Patent No.: US 10,365,755 B2
(45) Date of Patent: Jul. 30, 2019

(54) DISPLAY DEVICE WITH TOUCH DETECTION FUNCTION AND DISPLAY METHOD

(71) Applicant: Japan Display Inc., Tokyo (JP)

(72) Inventors: Hiroki Uchiyama, Tokyo (JP); Hidetoshi Komatsu, Tokyo (JP); Naoshi Goto, Tokyo (JP); Shunsuke Noichi, Tokyo (JP)

(73) Assignee: Japan Display Inc., Tokyo (JP)

( * ) Notice: Subject to any disclaimer, the term of this patent is extended or adjusted under 35 U.S.C. 154(b) by 88 days.

(21) Appl. No.: 15/408,907

(22) Filed: Jan. 18, 2017

(65) Prior Publication Data
US 2017/0205943 A1 Jul. 20, 2017

(30) Foreign Application Priority Data
Jan. 20, 2016 (JP) .................. 2016-008862

(51) Int. Cl.
*G06F 3/041* (2006.01)
*G06F 3/044* (2006.01)

(52) U.S. Cl.
CPC .......... *G06F 3/0416* (2013.01); *G06F 3/044* (2013.01); *G06F 3/0412* (2013.01); *G06F 3/0418* (2013.01)

(58) Field of Classification Search
CPC ........ G06F 3/0412; G06F 3/041; G06F 3/044; G06F 3/0416; G09G 2300/0408
See application file for complete search history.

(56) References Cited

U.S. PATENT DOCUMENTS

| 5,929,834 A * | 7/1999 | Inoue ................. G02F 1/13338 178/18.01 |
| 2013/0082954 A1* | 4/2013 | Azumi .................... G06F 3/041 345/173 |
| 2014/0152617 A1 | 6/2014 | Kida et al. | |
| 2015/0144920 A1* | 5/2015 | Yamazaki ............. H01L 27/323 257/40 |

FOREIGN PATENT DOCUMENTS

JP 2014-132445 A 7/2014

* cited by examiner

*Primary Examiner* — Sepehr Azari
(74) *Attorney, Agent, or Firm* — K&L Gates LLP

(57) ABSTRACT

Each of frame display periods is for performing a display operation based on image information on one frame and each of detection surface touch detection periods is from when touch detection is started to when the detection is completed on the entire detection surface. At least one frame display period of the frame display periods and at least one detection surface touch detection period of the detection surface touch detection periods are started based on a display synchronization signal. The display operation and the touch detection operation are performed in a time-division manner in the one frame display period. The length of the one detection surface touch detection period is longer than the one length of the frame display period.

14 Claims, 15 Drawing Sheets

DISPLAY DEVICE WITH TOUCH DETECTION FUNCTION AND DISPLAY METHOD

CROSS-REFERENCE TO RELATED APPLICATIONS

This application claims priority from Japanese Application No. 2016-008862, filed on Jan. 20, 2016, the contents of which are incorporated by reference herein in its entirety.

BACKGROUND

1. Technical Field

The present invention relates to a display device with a touch detection function that can detect an external proximate object and a display method.

2. Description of the Related Art

Touch detection devices capable of detecting an external proximate object, what are called touch panels, have recently been attracting attention. Touch panels are mounted on or integrated with a display device, such as a liquid crystal display device, and used as display devices with a touch detection function. Such display devices with a touch detection function display various types of button images and the like on the display device, thereby enabling a user to input information using the touch panel instead of general mechanical buttons. Japanese Patent Application Laid-open Publication No. 2014-132445 (JP-A-2014-132445) discloses a display device with a touch detecting function that performs a display operation of a display panel and a touch detection operation of a touch panel in a time-division manner in a display period for one frame of the display panel. The display device with a touch detecting function described in JP-A-2014-132445 starts a touch detection period (touch report period) for one detection surface at a timing when a display period (frame period) for one frame is started. In this case, the display period for one frame includes one or two or more touch detection periods for one detection surface.

In the display device with a touch detecting function described in JP-A-2014-132445, the frequency at which the touch detection operation for one detection surface is repeatedly performed is equal to or higher than the frequency at which the display operation for one frame is repeatedly performed. As the frequency at which the display operation for one frame is repeatedly performed increases, the length of the touch detection period decreases. As a result, the display device with a touch detecting function may possibly fail to sufficiently detect touch detection signals, thereby reducing the touch detection accuracy.

For the foregoing reasons, there is a need for providing a display device with a touch detection function and a display method that can improve the flexibility of a touch detection period for one detection surface and suppress reduction in the touch detection accuracy.

SUMMARY

According to an aspect, a display device with a touch detection function includes a first electrode configured to be supplied with a display drive signal, a plurality of second electrodes configured to be sequentially supplied with a pixel signal, a display functional layer configured to perform a display operation based on the display drive signal and the pixel signal, and a plurality of touch detection electrodes configured to sequentially output a touch detection signal and configured to perform a touch detection operation. Each of frame display periods is for performing the display operation based on image information on one frame, each of detection surface touch detection periods is from when touch detection is started to when the detection is completed on an entire detection surface, at least one frame display period of the frame display periods and at least one detection surface touch detection period of the detection surface touch detection periods are started based on a display synchronization signal, the display operation and the touch detection operation are performed in a time-division manner in the one frame display period, and the length of the one detection surface touch detection period is longer than the one length of the frame display period.

According to another aspect, a display device with a touch detection function includes a first electrode configured to be supplied with a display drive signal, a plurality of second electrodes configured to be sequentially supplied with a pixel signal, a display functional layer configured to perform a display operation based on the pixel signal and the display drive signal, a plurality of touch detection electrodes configured to sequentially output a touch detection signal and configured to perform a touch detection operation, a clock generator configured to generate a reference clock signal serving as a reference for start time of the display operation and the touch detection operation, and a first counter and a second counter configured to measure number of pulses of the reference clock signal. Each of frame display periods is for performing the display operation based on image information on one frame, each of detection surface touch detection periods is from when touch detection is started to when the detection is completed on an entire detection surface, at least one frame display period of the frame display periods and at least one detection surface touch detection period of the detection surface touch detection periods are started based on a display synchronization signal, the display operation and the touch detection operation are performed in a time-division manner in the one frame display period, the first counter is configured to measure the number of pulses of the reference clock signal at least in one frame display period, the second counter is configured to measure the number of pulses of the reference clock signal at least in one detection surface touch detection period, and a count value of the second counter at least in the detection surface touch detection period is larger than a count value of the first counter at least in one frame display period.

According to another aspect, a display method performed by a display device with a touch detection function includes a first electrode configured to be supplied with a display drive signal, a plurality of second electrodes configured to be sequentially supplied with a pixel signal, a display functional layer configured to perform a display operation based on the display drive signal and the pixel signal, and a plurality of touch detection electrodes configured to sequentially output a touch detection signal and configured to perform a touch detection operation. Each of frame display periods is for performing the display operation based on image information on one frame, each of detection surface touch detection periods is from when touch detection is started to when the detection is completed on an entire detection surface, at least one frame display period of the frame display periods and at least one detection surface touch detection period of the detection surface touch detection periods are started based on a display synchronization signal, the display operation and the touch detection operation are performed in a time-division manner in the one frame display period, and the length of the one detection surface touch detection period is longer than the length of the one frame display period.

DETAILED DESCRIPTION

Figure 1:
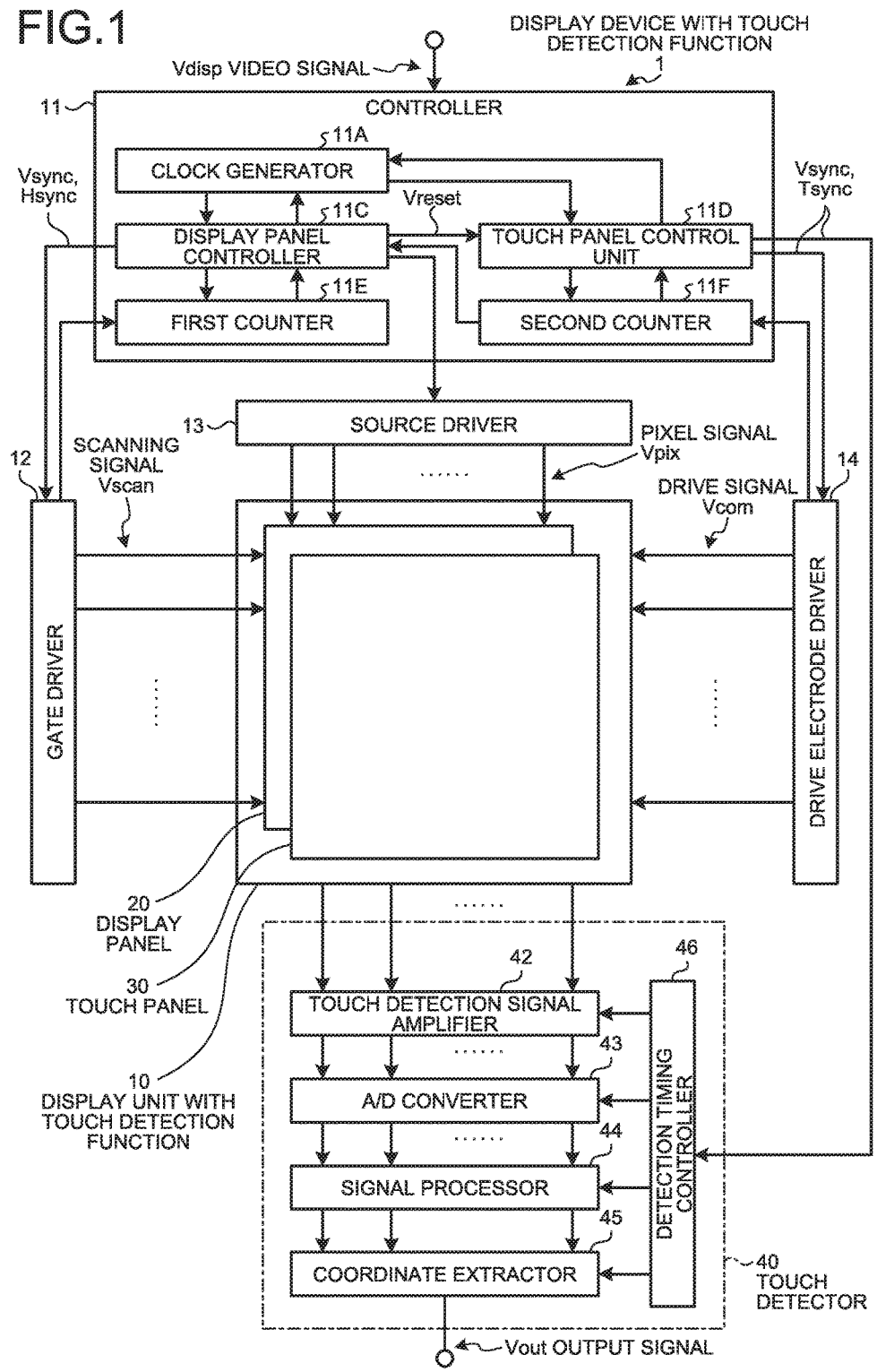
FIG. 1 is a block diagram of an exemplary configuration of a display device with a touch detection function according to a first embodiment.

Exemplary aspects (embodiments) to implement the present invention are described below in greater detail with reference to the accompanying drawings. The contents described in the embodiments below are not intended to limit the present invention. Components described below include components easily conceivable by those skilled in the art and components substantially identical therewith. Furthermore, the components described below can be appropriately combined. The disclosure is given by way of example only, and appropriate changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to preceding figures are denoted by like reference numerals, and overlapping explanation thereof will be appropriately omitted.

First Embodiment

FIG. 1 is a block diagram of an exemplary configuration of a display device with a touch detection function according to a first embodiment. As illustrated in FIG. 1, a display device with a touch detection function 1 includes a display unit with a touch detection function 10, a controller 11, a gate driver 12, a source driver 13, a drive electrode driver 14, and a touch detector 40. The display device with a touch detection function 1 is a display device including the display unit with a touch detection function 10 having a touch detection function. The display unit with a touch detection function 10 is a device in which a display panel 20 is integrated with a touch panel 30. The display panel 20 includes liquid crystal display elements serving as display elements. The touch panel 30 serves as a touch detecting device that detects touch input. The display unit with a touch detection function 10 may be an on-cell device in which the touch panel 30 is mounted on the display panel 20. The display panel 20 may be what is called an organic electroluminescence (EL) display panel, for example.

The display panel 20 is a display device that performs display by sequentially scanning each horizontal line based on scanning signals Vscan supplied from the gate driver 12, which will be described later.

The controller 11 is a circuit that supplies controls signals to the gate driver 12, the source driver 13, the drive electrode driver 14, and the touch detector 40 based on video signals Vdisp supplied from the outside. The controller 11 performs control such that the drivers and the detector operate synchronously or asynchronously with one another. The controller 11 includes a display panel controller 11C and a touch panel controller 11D. The display panel controller 11C mainly controls a display operation of the display panel 20, and the touch panel controller 11D mainly controls a touch detection operation of the touch panel 30.

The gate driver 12 has a function to sequentially select one horizontal line to be a target of display drive in the display unit with a touch detection function 10 based on the control signals (vertical synchronization signals Vsync and horizontal synchronization signals Hsync) supplied from the display panel controller 11C of the controller 11.

The source driver 13 is a circuit that supplies pixel signals Vpix to sub-pixels SPix, which will be described later, of the display unit with a touch detection function 10 based on the control signals and the pixel signals Vpix supplied from the display panel controller 11C of the controller 11.

The drive electrode driver 14 is a circuit that supplies drive signals Vcom to drive electrodes COML, which will be described later, of the display unit with a touch detection function 10 based on the control signals (vertical synchronization signals Vsync and touch detection synchronization signals Tsync) supplied from the touch panel controller 11D of the controller 11.

The touch panel 30 operates based on a basic principle of capacitance touch detection to detect contact or proximity of an external conductor. If the touch panel 30 detects contact or proximity of an external conductor, the touch panel 30 outputs touch detection signals Vdet.

The touch detector 40 is a circuit that determines whether a touch is made on the touch panel 30 based on the control signals supplied from the touch panel controller 11D of the controller 11 and on the touch detection signals Vdet supplied from the touch panel 30. If a touch is detected, the touch detector 40 derives coordinates at which the touch input is performed, for example. The touch detector 40 includes a touch detection signal amplifier 42, an analog/digital (A/D) converter 43, a signal processor 44, a coordinate extractor 45, and a detection timing controller 46.

Figure 2:
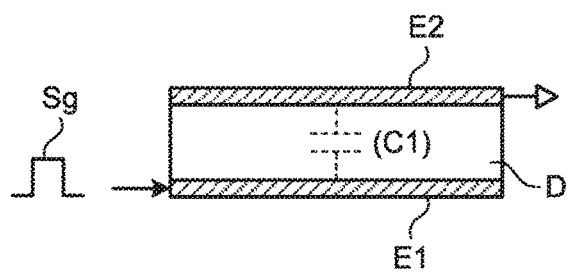
FIG. 2 is a diagram for explaining a basic principle of a capacitance touch detection system and illustrates a state where a finger is neither in contact with nor in proximity to a touch detection electrode.
Figure 3:
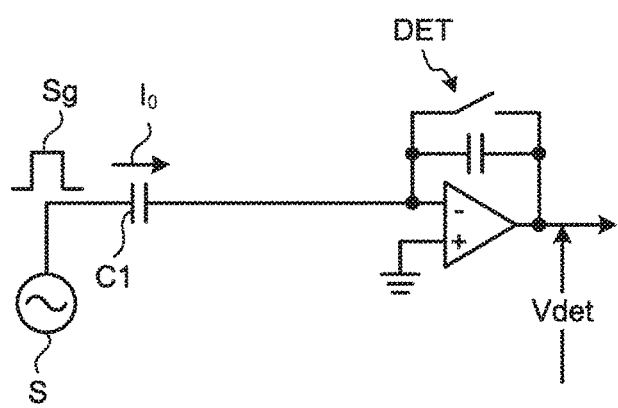
FIG. 3 is a diagram for explaining an example of an equivalent circuit in the state where a finger is neither in contact with nor in proximity to the touch detection electrode as illustrated in FIG. 2.
Figure 4:
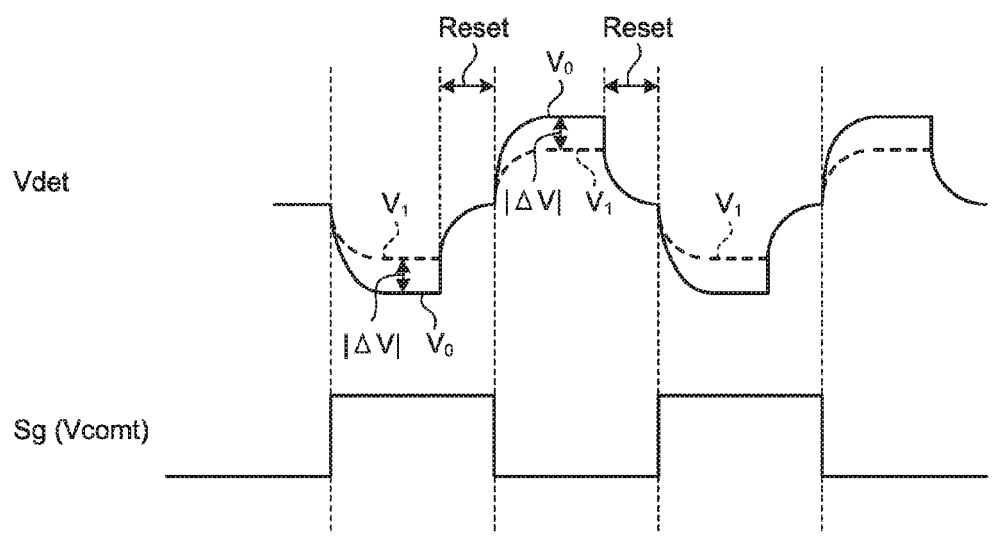
FIG. 4 is a diagram of an example of waveforms of a drive signal and a touch detection signal.

As described above, the touch panel 30 operates based on the basic principle of capacitance touch detection. The following describes the basic principle of a capacitance touch detection system of the display device with a touch detection function 1 according to the present embodiment with reference to FIGS. 2 to 4. FIG. 2 is a diagram for explaining the basic principle of the capacitance touch detection system and illustrates a state where a finger is neither in contact with nor in proximity to a touch detection electrode. FIG. 3 is a diagram for explaining an example of an equivalent circuit in the state where a finger is neither in contact with nor in proximity to the touch detection electrode as illustrated in FIG. 2. FIG. 4 is a diagram of an example of waveforms of a drive signal and a touch detection signal. While the following describes a case where a finger is in contact with or in proximity to the touch detection electrode, the external proximate object is not limited to a finger and may be an object including a conductor, such as a stylus.

As illustrated in FIG. 2, for example, a capacitance element C1 includes a pair of electrodes of a drive electrode E1 and a touch detection electrode E2 facing each other with a dielectric D interposed therebetween. As illustrated in FIG. 3, a first end of the capacitance element C1 is coupled to an alternating-current (AC) signal source (drive signal source) S, whereas a second end thereof is coupled to a voltage detector (touch detector) DET. The voltage detector DET is an integration circuit included in the touch detection signal amplifier 42 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitance element C1), an output waveform (touch detection signal Vdet) illustrated in FIG. 4 is generated via the voltage detector DET coupled to the touch detection electrode E2 (second end of the capacitance element C1). The AC rectangular wave Sg corresponds to the drive signal Vcom (touch drive signal Vcomt, which will be described later) received from the drive electrode driver 14.

In a state where a finger is neither in contact with nor in proximity to the touch detection electrode (non-contact state), an electric current $I_0$ depending on the capacitance value of the capacitance element C1 flows in association with charge and discharge of the capacitance element C1 as illustrated in FIGS. 2 and 3. The voltage detector DET illustrated in FIG. 3 converts fluctuations in the electric current $I_0$ depending on the AC rectangular wave Sg into fluctuations in the voltage (waveform $V_0$ indicated by the solid line (refer to FIG. 4)).

By contrast, in a state where a finger is in contact with or in proximity to the touch detection electrode (contact state), capacitance generated by the finger is in contact with or in proximity to the touch detection electrode E2. In this state, fringe capacitance between the drive electrode E1 and the touch detection electrode E2 is blocked. As a result, the capacitance element C1 acts as a capacitance element having a capacitance value smaller than that in the non-contact state. An electric current fluctuating depending on a change in the capacitance element C1 flows. As illustrated in FIG. 4, the voltage detector DET converts fluctuations in the electric current depending on the AC rectangular wave Sg into fluctuations in the voltage (waveform $V_1$ indicated by the dotted line). In this case, the waveform $V_1$ has amplitude smaller than that of the waveform $V_0$. An absolute value $|\Delta V|$ of voltage difference between the waveform $V_0$ and the waveform $V_1$ varies depending on an effect of a conductor, such as a finger, in contact with or in proximity to the touch detection electrode from the outside. To accurately detect the absolute value $|\Delta V|$ of the voltage difference between the waveform $V_0$ and the waveform $V_1$, the voltage detector DET preferably operates having a period Reset for resetting charge and discharge of a capacitor based on the frequency of the AC rectangular wave Sg by switching in the circuit.

The touch panel 30 illustrated in FIG. 1 sequentially scans each detection block based on the drive signals Vcom supplied from the drive electrode driver 14, thereby performing capacitance touch detection.

The touch panel 30 outputs the touch detection signals Vdet of respective detection blocks from a plurality of touch detection electrodes TDL, which will be described later, via the voltage detector DET illustrated in FIG. 3. The touch panel 30 supplies the touch detection signals Vdet to the touch detection signal amplifier 42 of the touch detector 40.

The touch detection signal amplifier 42 amplifies the touch detection signals Vdet supplied from the touch panel 30. The touch detection signal amplifier 42 may include an analog low-pass filter (LPF) serving as a low-pass analog filter that removes high-frequency components (noise components) included in the touch detection signals Vdet and outputs the remaining components.

The A/D converter 43 samples the analog signals output from the touch detection signal amplifier 42 at a timing synchronized with the drive signals Vcom, thereby converting the analog signals into digital signals.

The signal processor 44 includes a digital filter that reduces frequency components (noise components) at other frequencies than the frequency at which the drive signals Vcom are sampled in the output signals from the A/D converter 43. The signal processor 44 is a logic circuit that determines whether a touch is made on the touch panel 30 based on the output signals from the A/D converter 43. The signal processor 44 performs processing of extracting only the difference between the detection signals caused by a finger. The signal of difference caused by a finger corresponds to the absolute value $|\Delta V|$ of the difference between the waveform $V_0$ and the waveform $V_1$. The signal processor 44 may perform an arithmetic operation for averaging the absolute value |ΔV| per detection block, thereby calculating the average of the absolute value |ΔV|. With this operation, the signal processor 44 can reduce an effect of noise. The signal processor 44 compares the detected signal of difference caused by a finger with a predetermined threshold voltage. If the signal of difference is lower than the threshold voltage, the signal processor 44 determines that an external proximate object is in the non-contact state. By contrast, if the signal processor 44 compares the detected digital voltage with the predetermined threshold voltage, and the digital voltage is equal to or higher than the threshold voltage, the signal processor 44 determines that an external proximate object is in the contact state. The touch detector 40 thus can perform touch detection.

The coordinate extractor 45 is a logic circuit that derives, when the signal processor 44 detects a touch, the touch panel coordinates of the touch. The detection timing controller 46 performs control such that the touch detection signal amplifier 42, the A/D converter 43, the signal processor 44, and the coordinate extractor 45 operate in synchronization with one another. The coordinate extractor 45 outputs the touch panel coordinates as detection signal output Vout. The touch detector 40 does not necessarily include the signal processor 44 or the coordinate extractor 45. In this case, the touch detector 40 may output the output signals from the A/D converter 43 as the output signals Vout.

Figure 5:
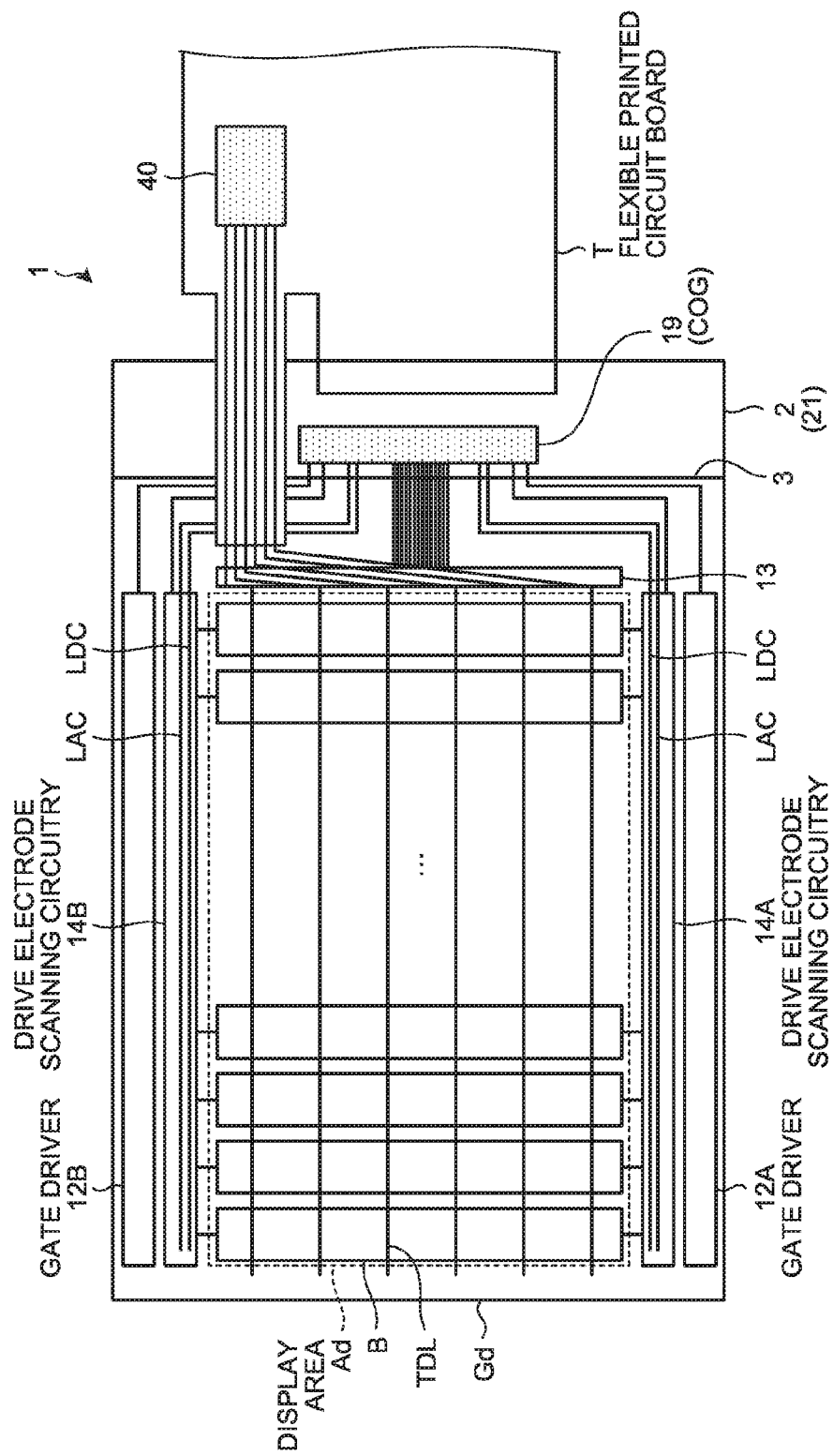
FIG. 5 is a schematic of an example of a module provided with the display device with a touch detection function.

FIG. 5 is a schematic of an example of a module provided with the display device with a touch detection function. As illustrated in FIG. 5, the display device with a touch detection function 1 includes a pixel substrate 2 (first substrate 21), which will be described later, and a printed circuit board T. The printed circuit board T is a flexible printed circuit board, for example. The pixel substrate 2 (first substrate 21) is provided with a chip on glass (COG) 19 and has a display area Ad of the display panel 20 and a frame Gd. The COG 19 is a chip of an integrated circuit (IC) driver mounted on the first substrate 21 and is a control device serving as the controller 11 illustrated in FIG. 1 and including circuits required for a display operation. The source driver 13 according to the present embodiment is provided on the first substrate 21. Alternatively, the source driver 13 may be included in the COG 19. Drive electrode scanning circuitries 14A and 14B serving as part of the drive electrode driver 14 are provided to the first substrate 21. The gate driver 12 is also provided to the first substrate 21 as gate drivers 12A and 12B. The display device with a touch detection function 1 may include circuits, such as the drive electrode scanning circuitries 14A and 14B and the gate driver 12, in the COG 19. The COG 19 is given by way of example of an implementation form, and the embodiment is not limited thereto. A component having the same functions as those of the COG 19 may be provided as a chip on film or a chip on flexible (COF), for example.

As illustrated in FIG. 5, drive electrode blocks B of the drive electrodes COML intersect with the touch detection electrodes TDL viewed in a direction perpendicular to the surface of the first substrate 21.

The drive electrodes COML are divided into a plurality of stripe electrode patterns extending in one direction. To perform a touch detection operation, the drive electrode driver 14 sequentially supplies the drive signals Vcom to the electrode patterns. The drive electrode block B illustrated in FIG. 5 corresponds to a plurality of stripe electrode patterns of the drive electrodes COML simultaneously supplied with the drive signals Vcom. The drive electrode blocks B (drive electrodes COML) are arrayed in the long-side direction of the display unit with a touch detection function 10. The touch detection electrodes TDL, which will be described later, extend in a direction intersecting with the extending direction of the drive electrode blocks B. The touch detection electrodes TDL are arrayed in the short-side direction of the display unit with a touch detection function 10, for example. The output of the touch detection electrodes TDL is provided on the short side of the display unit with a touch detection function 10. The output is coupled to the touch detector 40 mounted on the printed circuit board T via the printed circuit board T. As described above, the touch detector 40 is mounted on the printed circuit board T and is coupled to the touch detection electrodes TDL arranged side by side. The printed circuit board T is not limited to a flexible printed circuit board and may be a rigid circuit board or a rigid-flexible circuit board. The touch detector 40 is not necessarily mounted on the printed circuit board T and may be provided on a control circuit board arranged outside the module and coupled via the printed circuit board T. While the touch detector 40 according to the present embodiment is a touch driver IC mounted on the printed circuit board T, part of the functions of the touch detector 40 may be provided as functions of a micro-processor (MPU). Specifically, part of functions (e.g., noise reduction) out of various functions that can be provided as those of the touch driver IC, such as A/D conversion and noise reduction, may be performed by a circuit, such as an MPU, provided separately from the touch driver IC. In a case where one driver IC is provided (one-chip configuration), detection signals may be transmitted to the touch driver IC on an array substrate via wires of the printed circuit board T, for example.

The source driver 13 is provided near the display area Ad on the first substrate 21. The display area Ad includes a number of sub-pixels SPix, which will be described later, arranged in a matrix (in rows and columns). The frame Gd is an area formed on the outer side of the display area Ad and including no sub-pixel SPix viewed in the direction perpendicular to the surface of the first substrate 21. The gate driver 12 and the drive electrode scanning circuitries 14A and 14B of the drive electrode driver 14 are arranged in the frame Gd.

The gate driver 12 includes the gate drivers 12A and 12B, for example. The gate driver 12 is composed of TFT elements and provided on the first substrate 21. The gate drivers 12A and 12B sandwich the display area Ad including the sub-pixels Spix (pixels), which will be described later, arranged in a matrix and can drive them from both sides. Scanning lines are arranged between the gate drivers 12A and 12B. Specifically, the scanning lines extend in a direction parallel to the extending direction of the drive electrodes COML viewed in the direction perpendicular to the surface of the first substrate 21. While the present embodiment includes two circuits as the gate drivers 12A and 12B, this is given by way of example of a specific configuration of the gate driver 12, and the embodiment is not limited thereto. The gate driver 12 may be one circuit provided to only one end of the scanning lines, for example.

The drive electrode scanning circuitries 14A and 14B are composed of TFT elements and provided on the first substrate 21. The drive electrode scanning circuitries 14A and 14B are supplied with display drive signals Vcomd via a display wire LDC and with touch drive signals Vcomt via a touch wire LAC from a drive signal generator. The drive electrode scanning circuitries 14A and 14B can drive, from both sides, the drive electrode blocks B arranged side by side. The display wire LDC that supplies the display drive signals Vcomd and the touch wire LAC that supplies the touch drive signals Vcomt are arranged in parallel in the frame Gd. The display wire LDC is arranged nearer the display area Ad than the touch wire LAC. With this configuration, the display drive signals Vcomd supplied by the display wire LDC stabilizes the potential state at the ends of the display area Ad. This configuration stabilizes display especially in a liquid crystal display device including lateral electric-field mode liquid crystals. While the present embodiment includes two circuits as the drive electrode scanning circuitries 14A and 14B, it may include only one of them.

The display device with a touch detection function 1 illustrated in FIG. 5 is coupled to the printed circuit board T in the extending direction of the touch detection electrodes TDL. This configuration facilitates routing of the wiring to couple the display device with a touch detection function 1 to the touch detector 40 via the printed circuit board T serving as a terminal.

Figure 6:
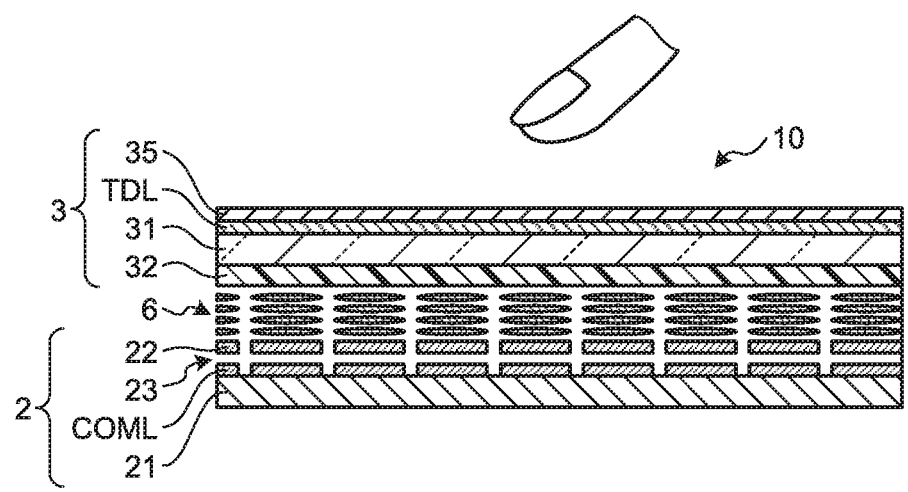
FIG. 6 is a sectional view of a schematic sectional structure of the display device with a touch detection function.

The following describes an exemplary configuration of the display unit with a touch detection function 10 in detail. FIG. 6 is a sectional view of a schematic sectional structure of the display device with a touch detection function. As illustrated in FIG. 6, the display unit with a touch detection function 10 includes the pixel substrate 2, a counter substrate 3, and a display functional layer (e.g., a liquid crystal layer 6). The counter substrate 3 is arranged facing the pixel substrate 2 in the direction perpendicular to the surface of the pixel substrate 2. The liquid crystal layer 6 is interposed between the pixel substrate 2 and the counter substrate 3.

The pixel substrate 2 includes the first substrate 21, a plurality of pixel electrodes (second electrodes) 22, a plurality of drive electrodes (first electrodes) COML, and an insulating layer 23. The first substrate 21 serves as a circuit board. The pixel electrodes 22 are arranged in a matrix above the first substrate 21. The drive electrodes COML are provided between the first substrate 21 and the pixel electrodes 22. The insulating layer 23 provides electrical insulation between the pixel electrodes 22 and the drive electrodes COML. The first substrate 21 is provided with thin-film transistors (TFT). A polarizing plate (not illustrated) may be provided under the first substrate 21 with an adhesive layer interposed therebetween.

While the drive electrodes COML, the insulating layer 23, and the pixel electrodes 22 are laminated in this order above the first substrate 21 according to the present embodiment, the embodiment is not limited thereto. The pixel electrodes 22, the insulating layer 23, and the drive electrodes COML may be laminated in this order above the first substrate 21. Alternatively, the pixel electrodes 22 and the drive electrodes COML may be provided to the same layer with an insulating layer interposed therebetween. At least one of the pixel electrodes 22 and the drive electrodes COML may be arranged on a second substrate 31.

The counter substrate 3 includes the second substrate 31 and a color filter 32 provided on a first surface of the second substrate 31. The counter substrate 3 further includes the touch detection electrodes TDL serving as detection electrodes of the touch panel 30 and provided on a second surface of the second substrate 31. A polarizing plate 35 is provided on the touch detection electrodes TDL with an adhesive layer interposed therebetween. The color filter 32 may be arranged on the first substrate 21. The first substrate 21 and the second substrate 31 are glass substrates, for example.

The liquid crystal layer 6 is provided between the first substrate 21 and the second substrate 31. The liquid crystal layer 6 modulates light passing therethrough depending on the state of an electric field. The liquid crystal layer 6, for example, is a display panel including liquid crystals in a lateral electric-field mode, such as the in-plane switching (IPS) mode including the fringe field switching (FFS) mode. An orientation film may be provided between the liquid crystal layer 6 and the pixel substrate 2 and between the liquid crystal layer 6 and the counter substrate 3 illustrated in FIG. 6.

An illuminator, which is not illustrated, is provided below the first substrate 21. The illuminator includes a light source, such as light emitting diodes (LED), and outputs light from the light source to the first substrate 21. The light from the illuminator passes through the pixel substrate 2. By switching parts at which the light is blocked and is not output depending on the state of liquid crystals at the positions and parts from which the light is output, the display unit with a touch detection function 10 displays an image on the display surface. In a reflective liquid crystal display device including reflective electrodes that reflect light entering from the second substrate 31 side and serve as the pixel electrodes 22 and including translucent drive electrodes COML on the counter substrate 3 side, no illuminator needs to be provided below the first substrate 21. The reflective liquid crystal display device may include a front light above the second substrate 31. In this case, light entering from the second substrate 31 side is reflected by the reflective electrodes (pixel electrodes 22), passes through the second substrate 31, and reaches the eyes of an observer. In a case where the display panel 20 is an organic EL display panel, the sub-pixels SPix each include a luminous body. Because the display unit with a touch detection function 10 displays an image by controlling the amount of light from the luminous bodies, no illuminator needs to be provided.

Figure 7:
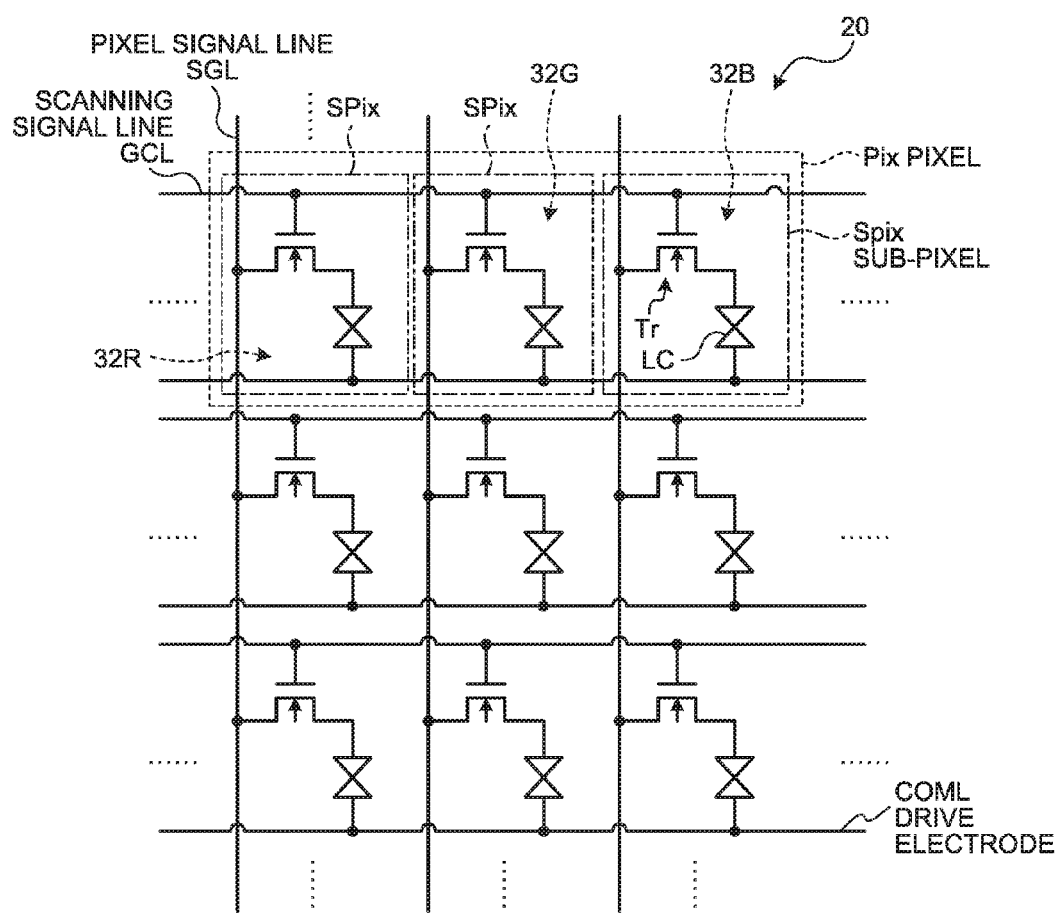
FIG. 7 is a circuit diagram of a pixel array in a display unit with a touch detection function according to the first embodiment.

FIG. 7 is a circuit diagram of a pixel array in the display unit with a touch detection function according to the first embodiment. The first substrate 21 illustrated in FIG. 6 is provided with thin-film transistor elements (hereinafter, referred to as TFT elements) Tr of the respective sub-pixels SPix and wires, such as pixel signal lines SGL and scanning signal lines GCL, as illustrated in FIG. 7. The pixel signal lines SGL supply the pixel signals Vpix to the pixel electrodes 22, and the scanning signal lines GCL drive the TFT elements Tr. The pixel signal lines SGL and the scanning signal lines GCL extend on a plane parallel to the surface of the first substrate 21.

The display panel 20 illustrated in FIG. 7 includes a plurality of sub-pixels SPix arrayed in a matrix. The sub-pixels SPix each include the TFT element Tr and a liquid crystal element LC. The TFT element Tr is a thin-film transistor and is an n-channel metal oxide semiconductor (MOS) TFT in this example. One of the source and the drain of the TFT element Tr is coupled to the pixel signal line SGL, the gate thereof is coupled to the scanning signal line GCL, and the other of the source and the drain thereof is coupled to a first end of the liquid crystal element LC. The first end of the liquid crystal element LC is coupled to the other of the source and the drain of the TFT element Tr, and a second end thereof is coupled to the drive electrode COML.

The sub-pixel SPix is coupled to other sub-pixels SPix belonging to the same row in the display panel 20 by the scanning signal line GCL. The scanning signal lines GCL are coupled to the gate driver 12 (refer to FIG. 1) and supplied with the scanning signals Vscan from the gate driver 12. The sub-pixel SPix is coupled to other sub-pixels SPix belonging to the same column in the display panel 20 by the pixel signal line SGL. The pixel signal lines SGL are coupled to the source driver 13 (refer to FIG. 1) and supplied with the pixel signals Vpix from the source driver 13. The sub-pixel SPix is also coupled to the other sub-pixels SPix belonging to the same row by the drive electrode COML. The drive electrodes COML are coupled to the drive electrode driver 14 (refer to FIG. 1) and supplied with the drive signals Vcom from the drive electrode driver 14. In other words, a plurality of sub-pixels SPix belonging to the same row share one drive electrode COML in this example. The extending direction of the drive electrodes COML according to the present embodiment is parallel to that of the scanning signal lines GCL.

While the extending direction of the drive electrodes COML according to the present embodiment is parallel to that of the scanning signal lines GCL, the embodiment is not limited thereto. The extending direction of the drive electrodes COML may be parallel to that of the pixel signal lines SGL. In this case, a plurality of sub-pixels SPix belonging to the same column share one drive electrode COML, and the drive electrode driver 14 is arranged at one of the ends in the extending direction of the pixel signal lines SGL on the display panel.

The gate driver 12 illustrated in FIG. 1 drives to sequentially scan the scanning signal lines GCL. The gate driver 12 applies the scanning signals Vscan (refer to FIG. 1) to the gates of the TFT elements Tr of the sub-pixels SPix via the scanning signal line GCL, thereby sequentially selecting one horizontal line out of the sub-pixels SPix as a target of display drive. The source driver 13 of the display device with a touch detection function 1 supplies the pixel signals Vpix to the sub-pixels SPix belonging to the horizontal line, thereby performing display for each horizontal line. To perform the display operation, the drive electrode driver 14 applies the drive signals Vcom (display drive signals Vcomd) to the drive electrode COML corresponding to at least one horizontal line. The drive electrode driver 14 may apply the drive signals Vcom (display drive signals Vcomd) to a plurality or all of drive electrodes COML including the drive electrode COML corresponding to one horizontal line supplied with the scanning signals Vscan.

The color filter 32 illustrated in FIG. 6 has color areas 32R, 32G, and 32B of three colors of red (R), green (G), and blue (B), respectively, that are periodically arrayed, for example. The color areas 32R, 32G, and 32B of the three colors of R, G, and B, respectively, serve as a group and are associated with the respective sub-pixels SPix illustrated in FIG. 7. A group of the color areas 32R, 32G, and 32B constitutes a pixel Pix. As illustrated in FIG. 6, the color filter 32 faces the liquid crystal layer 6 in a direction perpendicular to the first substrate 21. The color filter 32 may have another combination of colors as long as they are different colors. The color filter 32 does not necessarily have a combination of three colors and may have a combination of four or more colors. The display unit with a touch detection function 10 does not necessarily have the color filter 32 and may perform monochrome display.

Figure 8:
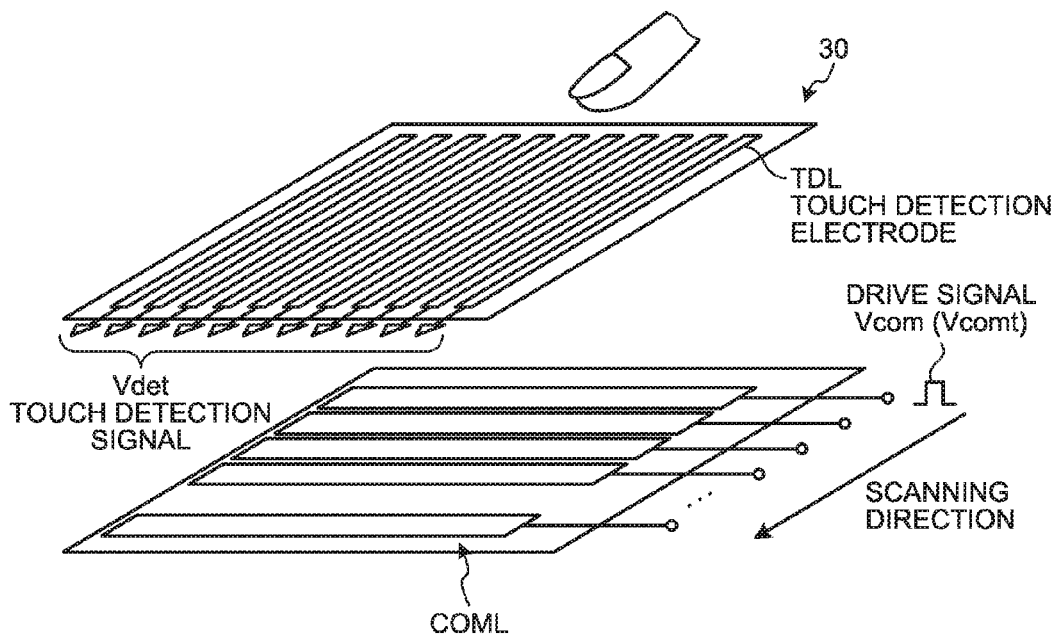
FIG. 8 is a perspective view of an exemplary configuration of drive electrodes and touch detection electrodes in the display unit with a touch detection function according to the first embodiment.

The drive electrodes COML illustrated in FIGS. 6 and 7 function as common electrodes that apply a common potential to a plurality of sub-pixels SPix in the display panel 20 and as drive electrodes used in touch detection in the touch panel 30. FIG. 8 is a perspective view of an exemplary configuration of the drive electrodes and the touch detection electrodes in the display unit with a touch detection function according to the first embodiment. The touch panel 30 includes the drive electrodes COML in the pixel substrate 2 and the touch detection electrodes TDL in the counter substrate 3.

The drive electrodes COML are divided into a plurality of stripe electrode patterns extending in the horizontal direction in FIG. 8. The touch detection electrodes TDL include a plurality of electrode patterns extending in a direction intersecting with the extending direction of the electrode patterns of the drive electrodes COML. The touch detection electrodes TDL face the drive electrodes COML in the direction perpendicular to the surface of the first substrate 21 (refer to FIG. 6). The electrode patterns of the touch detection electrodes TDL are coupled to respective input terminals of the touch detection signal amplifier 42 of the touch detector 40 (refer to FIG. 1). The electrode patterns of the drive electrodes COML and those of the touch detection electrodes TDL have capacitance generated at their intersections.

The touch detection electrodes TDL and the drive electrodes COML are made of a translucent conductive material, such as indium tin oxide (ITO). The electrodes constituting the touch detection electrodes TDL may be made of a metallic conductive material. In this case, the touch detection electrodes TDL may be made of a metallic material including at least one of aluminum (Al), copper (Cu), silver (Ag), molybdenum (Mo), and an alloy of these metals. The touch detection electrodes TDL may be a laminated body having a plurality of layers made of one or more of these metallic materials. In a case where the touch detection electrodes TDL are made of a metallic conductive material, they are preferably subjected to invisualization processing, such as mesh processing and plating with a black material. The touch detection electrodes TDL and the drive electrodes COML do not necessarily have a shape divided into a plurality of stripe patterns. The touch detection electrodes TDL and the drive electrodes COML may have a comb shape, for example. The touch detection electrodes TDL and the drive electrodes COML simply need to have a shape divided into a plurality of pieces. The shape of slits that divide the drive electrodes COML may be a straight line or a curved line.

With this structure, to perform a touch detection operation in the touch panel 30, the drive electrode driver 14 drives to sequentially scan the drive electrodes COML in a time-division manner, thereby sequentially selecting one detection block of the drive electrodes COML. The drive electrode driver 14 sequentially supplies the drive signals Vcom (touch drive signals Vcomt) to the selected detection block of the drive electrodes COML in a scanning direction, thereby sequentially performing scanning drive. The touch detection electrodes TDL output the touch detection signals Vdet, thereby performing touch detection in one detection block. The detection block of the drive electrodes COML includes electrode patterns of one or a plurality of drive electrodes COML. The detection blocks extend in a direction along the extending direction of the drive electrodes COML and are arrayed in the scanning direction.

Each detection block of the drive electrodes COML corresponds to the drive electrode E1 in the basic principle of the capacitance touch detection system, whereas the touch detection electrodes TDL correspond to the touch detection electrode E2. The touch panel 30 detects touch input based on the basic principle. In the touch panel 30, as illustrated in FIG. 8, the touch detection electrodes TDL and the drive electrodes COML intersect with each other and serve as a capacitance touch sensor formed in a matrix. With this configuration, the display unit with a touch detection function 10 performs scanning over the entire touch detection surface of the touch panel 30, thereby detecting a position where an external conductor is in contact with or in proximity to the touch detection surface.

Figure 9:
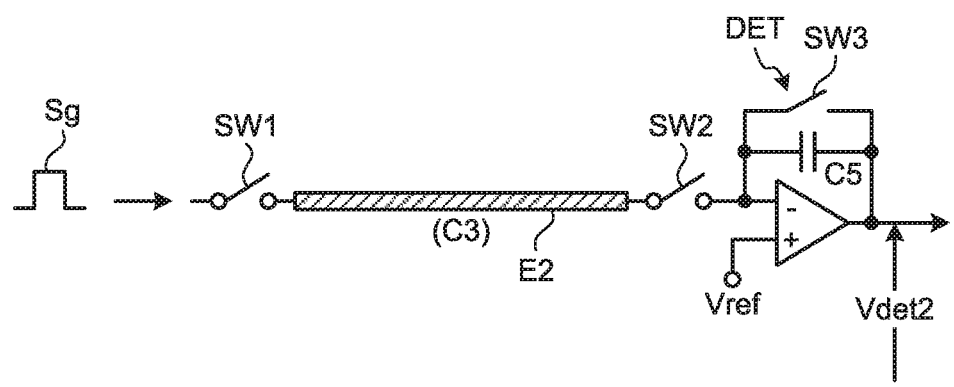
FIG. 9 is a diagram for explaining a basic principle of self-capacitance touch detection and illustrates a state where a finger is neither in contact with nor in proximity to a touch detection electrode.
Figure 10:
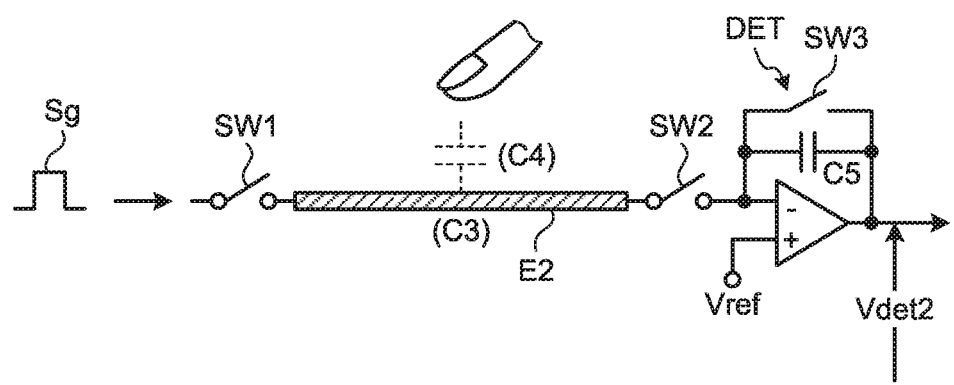
FIG. 10 is a diagram for explaining the basic principle of self-capacitance touch detection and illustrates a state where a finger is in contact with or in proximity to the touch detection electrode.
Figure 11:
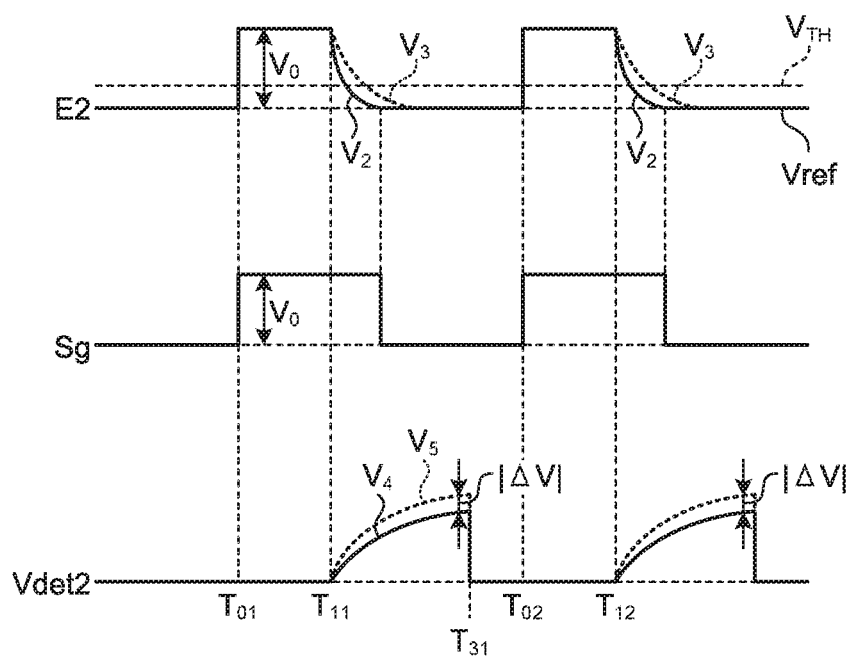
FIG. 11 is a diagram of an example of waveforms of a drive signal and a touch detection signal.

While the touch detection system according to the present embodiment, the basic principle of which is described with reference to FIGS. 2 to 4, is what is called a mutual capacitance system, it may be another system. The touch detection system may be a self-capacitance system, for example. The following describes a basic principle of self-capacitance touch detection with reference to FIGS. 9 to 11. FIG. 9 is a diagram for explaining the basic principle of self-capacitance touch detection and illustrates a state where a finger is neither in contact with nor in proximity to a touch detection electrode. FIG. 10 is a diagram for explaining the basic principle of self-capacitance touch detection and illustrates a state where a finger is in contact with or in proximity to the touch detection electrode. FIG. 11 is a diagram of an example of waveforms of a drive signal and a touch detection signal. FIGS. 9 and 10 also illustrate a detection circuit.

As illustrated in FIG. 9, in a state where a finger is neither in contact with nor in proximity to the touch detection electrode, the AC rectangular wave Sg at a predetermined frequency (e.g., approximately several kilohertz to several hundred kilohertz) is applied to the touch detection electrode E2. The touch detection electrode E2 has capacitance C3, and an electric current depending on the capacitance C3 flows. The voltage detector DET converts fluctuations in the electric current depending on the AC rectangular wave Sg into fluctuations in the voltage (waveform $V_4$ indicated by the solid line (refer to FIG. 11)).

As illustrated in FIG. 10, in a state where a finger is in contact with or in proximity to the touch detection electrode, capacitance C4 between the finger and the detected touch is added to the capacitance C3 of the touch detection electrode E2. When the AC rectangular wave Sg is applied to the touch detection electrode E2, an electric current depending on the capacitance C3 and C4 flows. As illustrated in FIG. 11, the voltage detector DET converts fluctuations in the electric current depending on the AC rectangular wave Sg into fluctuations in the voltage (waveform $V_5$ indicated by the dotted line). By integrating the voltage values of the calculated waveforms $V_4$ and $V_5$ and comparing these values, it is determined whether a finger is in contact with or in proximity to the touch detection electrode E2. The touch detector 40 does not necessarily employ the technique described above and may compare the voltage values without integrating them. Alternatively, the touch detector 40 may derive respective periods in a waveform $V_2$ and a waveform $V_3$ illustrated in FIG. 11 until they decreases to a predetermined reference voltage and compare the periods, for example.

Specifically, as illustrated in FIGS. 9 and 10, the touch detection electrode E2 can be cut off by a switch SW1 and a switch SW2. In FIG. 11, the AC rectangular wave Sg raises the voltage level by an amount corresponding to voltage $V_0$ at time $T_{01}$. At this time, the switch SW1 is turned on, and the switch SW2 is turned off. As a result, the voltage level in the touch detection electrode E2 is also raised by voltage $V_0$. Subsequently, the switch SW1 is turned off before time $T_{11}$. While the touch detection electrode E2 is in a floating state at this time, the electric potential of the touch detection electrode E2 is maintained at $V_0$ by the capacitance C3 (refer to FIG. 9) of the touch detection electrode or capacitance (C3+C4, refer to FIG. 10) obtained by adding the capacitance C4 generated by contact or proximity of a finger or the like to the capacitance C3 of the touch detection electrode. Subsequently, a switch SW3 is turned on before time $T_{11}$ and is turned off after a predetermined time has elapsed, thereby resetting the voltage detector DET. With this reset operation, the output voltage is made substantially equal to reference voltage Vref.

Subsequently, when the switch SW2 is turned on at time $T_{11}$, the voltage in an inversion input circuitry of the voltage detector DET is increased to the voltage $V_0$ equal to that of the detection electrode E2. Subsequently, the voltage in the inversion input circuitry of the voltage detector DET is decreased to the reference voltage Vref based on a time constant of the capacitance C3 (or C3+C4) of the touch detection electrode E2 and capacitance C5 in the voltage detector DET. Because the electric charge accumulated in the capacitance C3 (or C3+C4) of the touch detection electrode E2 moves to the capacitance C5 in the voltage detector DET, output from the voltage detector DET is increased (Vdet2). When a finger or the like is not in proximity to the touch detection electrode E2, the output (Vdet2) from the voltage detector DET is represented by the waveform $V_4$ indicated by the solid line, and Vdet2=C3× $V_0$/C5 is satisfied. When capacitance generated by an effect of a finger or the like is added, the output is represented by the waveform $V_5$ indicated by the dotted line, and Vdet2= (C3+C4)×$V_0$/C5 is satisfied. Subsequently, at time $T_{31}$ after the electric charge in the capacitance C3 (or C3+C4) of the touch detection electrode E2 sufficiently moves to the capacitance C5, the switch SW2 is turned off, and the switch SW1 and the switch SW3 are turned on. As a result, the electric potential of the touch detection electrode E2 is reduced to a low level equal to that of the AC rectangular wave Sg, and the voltage detector DET is reset. The timing to turn on the switch SW1 may be any timing as long as it is after the turning off of the switch SW2 and before time $T_{02}$. The timing to reset the voltage detector DET may be any timing as long as it is after the turning off of the switch SW2 and before time $T_{12}$. The operation described above is repeatedly performed at a predetermined frequency (e.g., approximately several kilohertz to several hundred kilohertz). As a result, it can be determined whether an external proximate object is present (whether a touch is made) based on the absolute value |ΔV| of the difference between the waveform $V_4$ and the waveform $V_5$. As illustrated in FIG. 11, when a finger or the like is not in proximity to the touch detection electrode, the electric potential of the touch detection electrode E2 is represented by a waveform $V_2$. By contrast, when the capacitance C4 generated by an effect of a finger or the like is added, the electric potential is represented by a waveform $V_3$. It may be determined whether an external proximate object is present (whether a touch is made) by measuring a time until when the waveforms $V_2$ and $V_3$ respectively decrease to predetermined voltage $V_{TH}$, for example.

Figure 12:
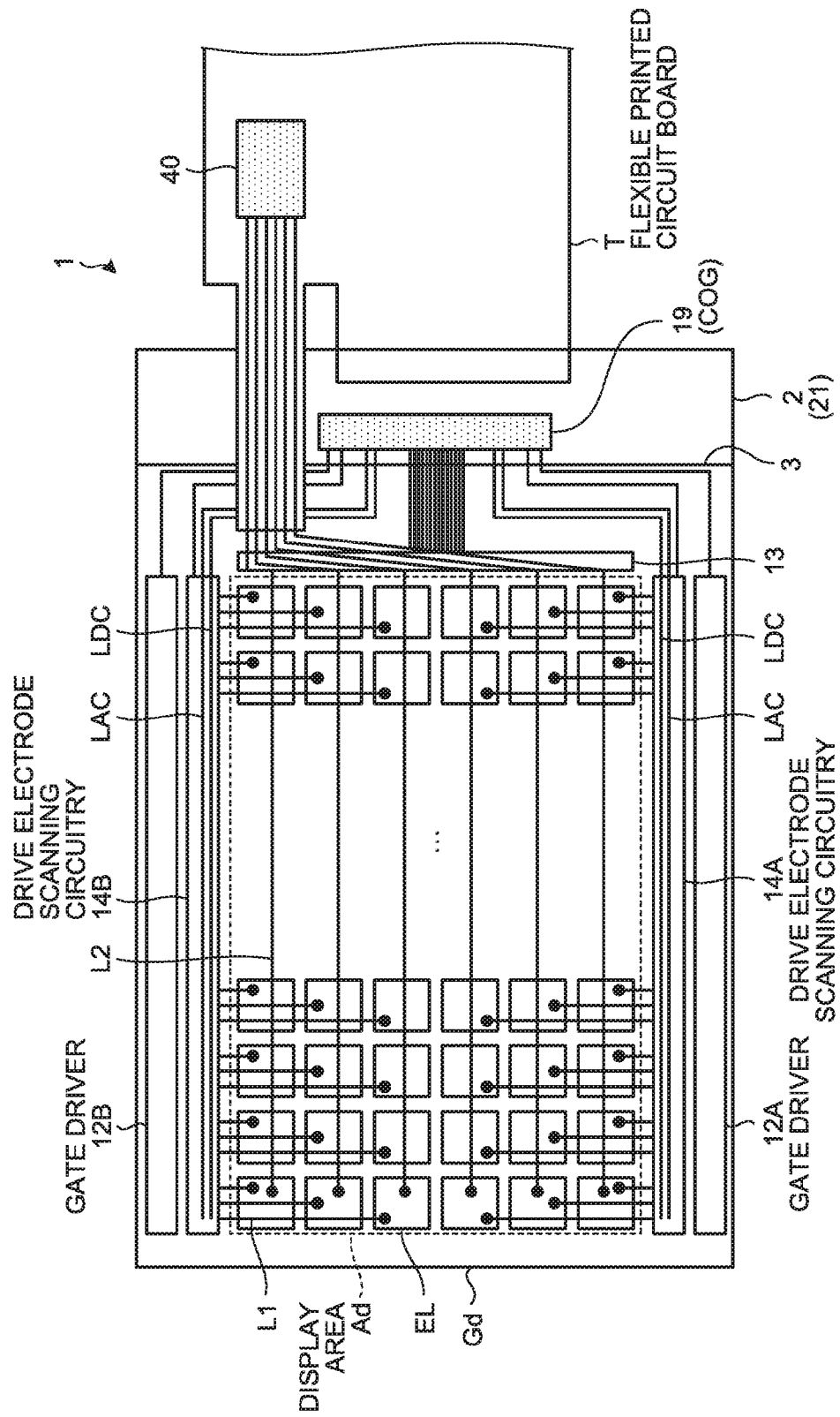
FIG. 12 is a schematic of another example of the module provided with the display device with a touch detection function.

FIG. 12 is a schematic of another example of the module provided with the display device with a touch detection function. In the case of a self-capacitance system, electrodes EL arranged in a matrix may be used as electrodes having both of the functions of the touch detection electrodes TDL and those of the drive electrodes COML. In this case, the electrodes EL are coupled to the drive electrode scanning circuitries 14A and 14B and the touch detector 40 via coupling portions, such as wires L1 and L2, respectively. While FIG. 12 illustrates only the wire L2 coupled to part of the electrodes EL, the wire L2 or coupling portions similar thereto are individually provided to all the electrodes EL in the actual configuration. The shape and the size of the electrodes EL may be appropriately determined, and the size may be the same as that of the pixel, for example. In this case, one of the electrodes constituting a pixel (e.g., the pixel electrode 22 in a pixel of the liquid crystal display device or the drive electrode COML serving as a counter electrode) may be used as the electrode EL. In other words, the touch detection electrodes EL may be also used as electrodes provided to respective pixels of the display device including a plurality of pixels. In this case, the touch detection electrodes TDL need not be provided. While the electrodes EL are coupled to the touch detector 40 via the printed circuit board T, the embodiment is not limited thereto. The COG 19 may have the functions of the touch detector 40, for example, and the electrodes EL may be coupled to the COG 19.

Figure 13:
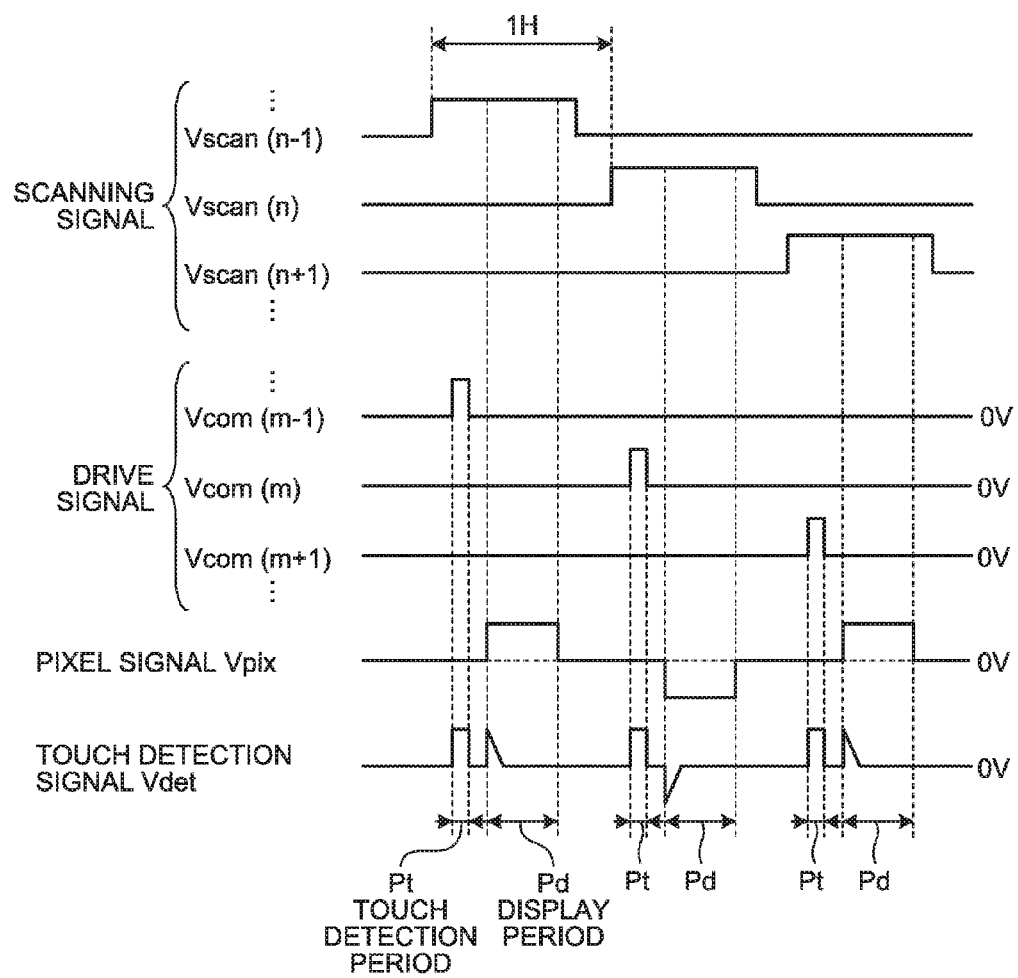
FIG. 13 is a timing waveform diagram of an exemplary operation of the display device with a touch detection function according to the first embodiment.

The following describes an operation of the display device with a touch detection function 1 in greater detail with reference to FIGS. 1, 7, and 13. FIG. 13 is a timing waveform diagram of an exemplary operation of the display device with a touch detection function according to the first embodiment. As illustrated in FIG. 13, the display panel 20 sequentially scans each horizontal line of consecutive scanning signal lines GCL of the (n−1)-th row, the n-th row, and the (n+1)-th row out of the scanning signal lines GCL based on the scanning signals Vscan supplied from the gate driver 12, thereby performing display. Similarly, the drive electrode driver 14 supplies the drive signals Vcom to consecutive drive electrodes COML of the (m−1)-th column, the m-th column, and the (m+1)-th column out of the drive electrodes COML in the display unit with a touch detection function 10 based on the control signals supplied from the controller 11. In the following description, the drive signals Vcom serving as display drive signals are referred to as the display drive signals Vcomd, whereas the drive signals Vcom serving as touch drive signals are referred to as the touch drive signals Vcomt.

As illustrated in FIG. 13, the display device with a touch detection function 1 performs a touch detection operation (touch detection period Pt) and a display operation (display period Pd) in a time-division manner in each display horizontal period 1H. In the touch detection operation, the display device with a touch detection function 1 selects a different drive electrode COML and applies the drive signal Vcom thereto in each display horizontal period 1H, thereby performing scanning for touch detection. The following describes the operation in detail.

The gate driver 12 applies the scanning signal Vscan to the scanning signal line GCL of the (n−1)-th row, thereby changing a scanning signal Vscan(n−1) from a low level to a high level. As a result, the first display horizontal period 1H is started.

In the touch detection period Pt, the drive electrode driver 14 applies the touch drive signal Vcomt to the detection block of the drive electrode COML of the (m−1)-th column, thereby changing a drive signal Vcom(m−1) from a low level to a high level. The drive signal Vcom(m−1) is transmitted to the touch detection electrodes TDL via capacitance, thereby changing the touch detection signals Vdet. If the drive signal Vcom(m−1) changes from the high level to the low level, the touch detection signals Vdet change in the same manner. The waveform of the touch detection signals Vdet in the touch detection period Pt corresponds to the touch detection signals Vdet in the basic principle of touch detection described above. The A/D converter 43 carries out A/D conversion on the touch detection signals Vdet in the touch detection period Pt, thereby performing touch detection. With this operation, the display device with a touch detection function 1 performs touch detection of one detection line.

In the subsequent display period Pd, the source driver 13 applies the pixel signals Vpix to the pixel signal lines SGL, thereby performing display of one horizontal line. As illustrated in FIG. 13, the change in the pixel signals Vpix can be transmitted to the touch detection electrodes TDL via stray capacitance, thereby changing the touch detection signals Vdet. In the display period Pd, the A/D converter 43 does not carry out A/D conversion, thereby suppressing an effect of the change in the pixel signals Vpix on touch detection. After the source driver 13 finishes supplying the pixel signals Vpix, the gate driver 12 changes the scanning signal Vscan(n−1) of the scanning signal line GCL of the (n−1)-th row from the high level to the low level. The first display horizontal period 1H is thus ended.

In the display period Pd, the drive electrode driver 14 applies the display drive signal Vcomd to the selected drive electrode COML. In the display period Pd, as illustrated in FIG. 13, the drive electrode COML is supplied with direct-current (DC) voltage of 0 V as the display drive signal Vcomd.

In other words, the touch drive signal Vcomt in this example is a rectangular wave signal having a low level portion and a high level portion. The display drive signal Vcomd is a DC voltage signal at a level equal to the low level of the touch drive signal Vcomt.

The drive electrode driver 14 in this example applies a DC voltage signal at the same level as that of the display drive signal Vcomd even in a period when the drive electrode COML is not selected by the gate driver 12. The drive electrode COML is not necessarily supplied with a voltage signal and may be in a floating state.

Subsequently, the gate driver 12 applies the scanning signal Vscan to the scanning signal line GCL of the n-th row, which is different from the previous scanning signal line GCL, thereby changing a scanning signal Vscan(n) from a low level to a high level. As a result, the second display horizontal period 1H is started.

In the touch detection period Pt, the drive electrode driver 14 applies a drive signal Vcom(m) to the drive electrode COML of the m-th column, which is different from the previous drive electrode COML. The A/D converter 43 carries out A/D conversion on the change in the touch detection signals Vdet, thereby performing touch detection of one detection line. In FIG. 13, the drive electrode driver 14 applies the drive signal Vcom to different drive electrodes COML of the (m−1)-th column, the m-th column, and the (m+1)-th column in consecutive display horizontal periods 1H. Alternatively, the drive electrode driver 14 may apply the drive signal Vcom to a single drive electrode COML a plurality of times in consecutive display horizontal periods 1H, thereby performing touch detection. Still alternatively, the drive electrode driver 14 may apply the drive signal Vcom to a single drive electrode COML a plurality of times in one display horizontal period 1H, thereby performing touch detection. Still alternatively, the drive electrode driver 14 may simultaneously apply the drive signal Vcom to a plurality of drive electrodes COML.

In the subsequent display period Pd, the source driver 13 applies the pixel signals Vpix to the pixel signal lines SGL, thereby performing display of one horizontal line. Because the display device with a touch detection function 1 according to the present embodiment performs line inversion drive, the polarity of the pixel signals Vpix applied by the source driver 13 is inverted from that in the first display horizontal period 1H. After the display period Pd is ended, the second display horizontal period 1H is ended. The driving method of the display panel 20 is not limited to the line inversion driving method and may be another driving method, such as a dot inversion driving method.

The display device with a touch detection function 1 repeats the operation described above, thereby performing a display operation by scanning the entire display surface and performs a touch detection operation by scanning the entire touch detection surface. The order of the display period Pd and the touch detection period Pt may be reversed. While the scanning signal lines GCL are supplied with the scanning signals Vscan in the touch detection period Pt, the embodiment is not limited thereto. The scanning signal lines GCL or the pixel signal lines SGL may be supplied with a fixed potential, such as the touch drive signals, or may be in a floating state in the touch period. This configuration can suppress an effect on the touch detection signals due to stray capacitance caused by the scanning signal lines GCL and the drive electrodes COML.

In one display horizontal period 1H, the display device with a touch detection function 1 performs the touch detection operation in the touch detection period Pt and the display operation in the display period Pd. Because the touch detection operation and the display operation are performed in a time-division manner in the respective periods, the display device with a touch detection function 1 can perform both the display operation and the touch detection operation in a single display horizontal period. In addition, the display device with a touch detection function 1 can suppress an effect of the display operation on touch detection.

Figure 14:
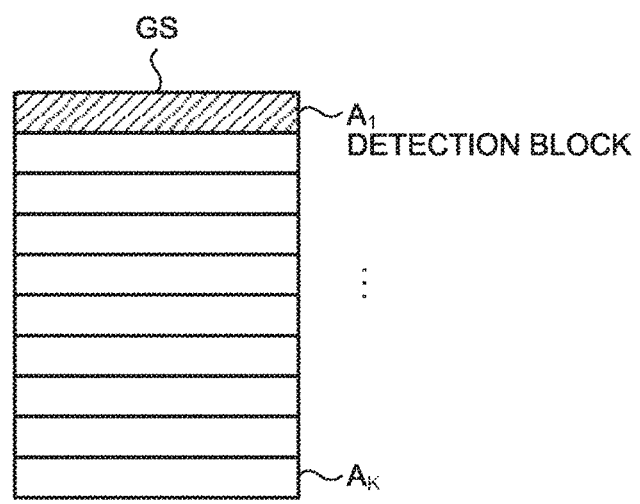
FIG. 14 is a diagram schematically illustrating an exemplary operation of a drive electrode driver according to the first embodiment.
Figure 15:
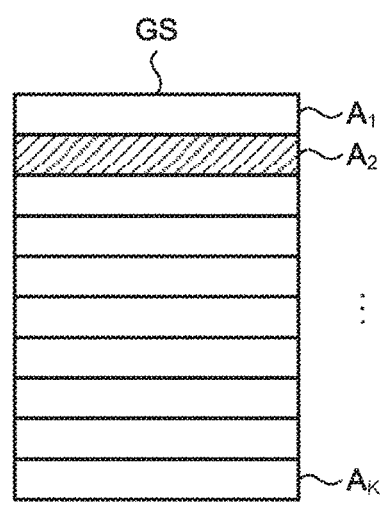
FIG. 15 is another diagram schematically illustrating an exemplary operation of the drive electrode driver according to the first embodiment.

FIGS. 14 and 15 are diagrams schematically illustrating an exemplary operation of the drive electrode driver 14. As illustrated in FIG. 14, a detection surface GS on which the display unit with a touch detection function 10 performs touch detection is divided into detection blocks $A_k$ (k=1, 2, . . . , K) from a detection block $A_1$ to a detection block $A_K$. While the number of detection blocks $A_k$ is 10 in FIGS. 14 and 15, the number is not limited thereto and may be 20 (K=20), for example. In a predetermined touch detection period Pt, the drive electrode driver 14 simultaneously applies the touch drive signal Vcomt to a predetermined number of drive electrodes COML corresponding to the detection block $A_1$. As illustrated in FIG. 15, in the next touch detection period Pt, the drive electrode driver 14 simultaneously applies the touch drive signal Vcomt to the predetermined number of drive electrodes COML corresponding to the detection block $A_2$. The number of drive electrodes COML corresponding to the detection block $A_k$ may be one or two or more. Alternatively, the number of drive electrodes COML may vary depending on the detection blocks $A_k$. As described above, the drive electrode driver 14 simultaneously applies the touch drive signal Vcomt to the predetermined number of drive electrodes COML. The drive electrode driver 14 sequentially applies the touch drive signals Vcomt to the detection blocks $A_k$ (k=1, 2, . . . , K), thereby performing touch detection scanning on the entire detection surface.

While the detection blocks $A_k$ do not overlap with each other in FIGS. 14 and 15, the embodiment is not limited thereto. Part of the detection blocks $A_k$ may overlap with each other, for example. Assuming a case where the drive electrodes COML are arrayed in order of a drive electrode $COML_1$, a drive electrode $COML_2$, a drive electrode $COML_3$, a drive electrode $COML_4$, . . . , a drive electrode $COML_X$ (X≥1), for example, the detection block $A_1$ on which detection is performed first may correspond to the drive electrode $COML_1$ and the drive electrode $COML_2$, and the detection block $A_2$ on which detection is performed second may correspond to the drive electrode $COML_2$ and the drive electrode $COML_3$. Alternatively, the detection block $A_2$ may correspond to the drive electrode $COML_2$, the drive electrode $COML_3$, and the drive electrode $COML_4$.

Figure 16:
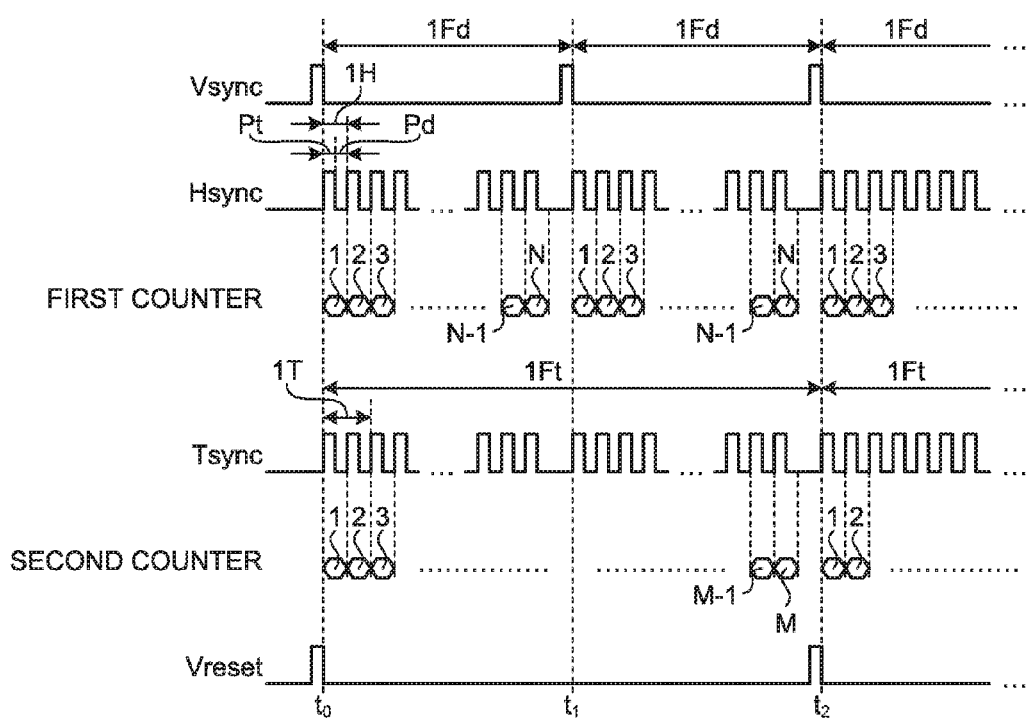
FIG. 16 is a diagram schematically illustrating a relation between frame display periods and detection surface touch detection periods according to the first embodiment.

The following describes an operation of the display device with a touch detection function 1 including a plurality of frame display periods and a plurality of detection surface touch detection periods. The frame display period is a period for performing a display operation based on image information on one frame. The detection surface touch detection period is a period from when touch detection is started on one detection surface GS to when the touch detection is completed on the entire detection surface GS. FIG. 16 is a diagram schematically illustrating a relation between the frame display periods and the detection surface touch detection periods according to the first embodiment.

As described above, the display operation of the display panel 20 illustrated in FIG. 1 is controlled mainly by the display panel controller 11C of the controller 11. The touch detection operation of the touch panel 30 is controlled mainly by the touch panel controller 11D of the controller 11. As illustrated in FIG. 1, the controller 11 further includes a clock generator 11A, a first counter 11E, and a second counter 11F.

The clock generator 11A illustrated in FIG. 1 generates a display reference clock for controlling a timing of the display operation of the display panel 20. The clock generator 11A supplies the display reference clock to the display panel controller 11C. The display reference clock is a signal including a plurality of pulses arranged at a regular cycle. The first counter 11E measures the number of pulses of the display reference clock. Based on the display reference clock received from the clock generator 11A, the display panel controller 11C generates the vertical synchronization signal (display synchronization signal) Vsync and the horizontal synchronization signal Hsync and supplies them to the gate driver 12. The vertical synchronization signal Vsync and the horizontal synchronization signal Hsync have pulse-like waveforms.

The clock generator 11A illustrated in FIG. 1 generates a touch reference clock for controlling a timing of the touch detection operation of the touch panel 30. The clock generator 11A supplies the touch reference clock to the touch panel controller 11D. The touch reference clock is a signal including a plurality of pulses arranged at a regular cycle. The second counter 11F measures the number of pulses of the touch reference clock. Based on the touch reference clock, the touch panel controller 11D generates the touch detection synchronization signal Tsync and supplies it to the drive electrode driver 14 and the touch detector 40. The touch panel controller 11D supplies at least one of a plurality of pulses of the vertical synchronization signal Vsync supplied from the display panel controller 11C to the drive electrode driver 14 and the touch detector 40.

The clock generator 11A may include a first clock generator that generates the display reference clock and a second clock generator that generates the touch reference clock. The touch reference clock and the display reference clock may be a common signal. In other words, the clock generator 11A may supply a common reference clock to the display panel controller 11C and the touch panel controller 11D. The first counter 11E and the second counter 11F may measure the number of pulses of the common reference clock. Based on the reference clock common to the display reference clock, the touch panel controller 11D may generate the touch detection synchronization signal Tsync and supply it to the drive electrode driver 14 and the touch detector 40.

As illustrated in FIGS. 1 and 16, to start a frame display period 1Fd and a detection surface touch detection period 1Ft, the display panel controller 11C supplies a reset signal Vreset to the touch panel controller 11D, thereby resetting the count value of the first counter 11E and that of the second counter 11F. The display panel 20 is supplied with the vertical synchronization signal Vsync from the display panel controller 11C, and the touch panel 30 is also supplied with the vertical synchronization signal Vsync at the same timing from the touch panel controller 11D. The display device with a touch detection function 1 simultaneously starts the frame display period 1Fd and the detection surface touch detection period 1Ft at time $t_0$ when the vertical synchronization signal Vsync is supplied.

In the frame display period 1Fd, the display panel controller 11C cyclically supplies the horizontal synchronization signal Hsync to the gate driver 12. The gate driver 12 supplies the scanning signal Vscan to the scanning signal line GCL at the timing when the horizontal synchronization signal Hsync is supplied, thereby sequentially performing the display operation in the display horizontal period 1H for each horizontal line as illustrated in FIG. 13. The period in which the horizontal synchronization signal Hsync is turned on (high level) corresponds to the touch detection period Pt for stopping the display operation and performing the touch detection operation, for example. By contrast, the period in which the horizontal synchronization signal Hsync is turned off (low level) corresponds to the display period Pd for performing the display operation. In the frame display period 1Fd, the display operation and the touch detection operation are performed in a time-division manner.

The gate driver 12 switches the scanning signal line GCL to be selected in each display horizontal period 1H and supplies the scanning signal Vscan to the selected scanning signal line GCL as described above. In case where the number of scanning signal lines GCL is N, the display panel controller 11C supplies the pixel signals Vpix including image information on one frame divided into N to the source driver 13. The display panel controller 11C thus performs the display operation in each display horizontal period 1H. The first counter 11E measures the number of pulses of the display reference clock supplied from the clock generator 11A. In this example, the pulses of the display reference clock are supplied in synchronization with the horizontal synchronization signal Hsync. Every time the display operation in one display horizontal period 1H is performed, the count value of the first counter 11E increments by 1, thereby increasing like 1, 2, . . . , N−1, N.

When the display operation in one display horizontal period 1H is repeatedly performed N-times, and the count value of the first counter 11E reaches N, the display panel controller 11C ends the frame display period 1Fd based on the information received from the first counter 11E. Subsequently, the display panel controller 11C supplies the next vertical synchronization signal Vsync to the gate driver 12 at time $t_1$, resets the count value of the first counter 11E, and performs the display operation based on image information on the next one frame. As described above, the display operation in one frame display period 1Fd is repeatedly performed in the display panel 20. Each frame display period 1Fd is started at time when the vertical synchronization signal Vsync is supplied.

In the detection surface touch detection period 1Ft, the touch panel controller 11D cyclically supplies the touch detection synchronization signal Tsync to the drive electrode driver 14 and the touch detector 40. The drive electrode driver 14 supplies the drive signal Vcom to the selected detection block $A_k$ (refer to FIGS. 14 and 15) of the drive electrodes COML at the timing when the touch detection synchronization signal Tsync is supplied. The touch detector 40 determines whether touch input is performed based on the touch detection signals Vdet output from the touch detection electrodes TDL.

As illustrated in FIG. 16, the touch detection synchronization signal Tsync is repeatedly turned on (high level) and turned off (low level). The touch detection synchronization signal Tsync according to the present embodiment has a pulse-like waveform having the same cycle as that of the horizontal synchronization signal Hsync. At the timing when the touch detection synchronization signal Tsync is turned on (high level), a detection block detection period 1T for performing touch detection on one detection block $A_k$ is started. The detection block detection period 1T in this example corresponds to a period including two pulses of the touch detection synchronization signal Tsync. In other words, the drive electrode driver 14 supplies the drive signal Vcom to one detection block $A_k$ in two touch detection periods Pt, thereby performing touch detection. When the touch detection operation on one detection block $A_k$ is finished, the drive electrode driver 14 selects the next detection block $A_k$ and performs touch detection at the timing when the touch detection synchronization signal Tsync is turned on (high level). By repeating this operation, the drive electrode driver 14 performs touch detection on all the detection blocks $A_k$ in one detection surface GS in the detection surface touch detection period 1Ft.

The touch panel controller 11D may supply the horizontal synchronization signal Hsync supplied from the display panel controller 11C to the drive electrode driver 14 and the touch detector 40 instead of the touch detection synchronization signal Tsync. The drive electrode driver 14 may perform touch detection on one detection block $A_k$ in one touch detection period Pt or in three or more touch detection periods Pt.

The second counter 11F illustrated in FIG. 1 measures the number of pulses of the touch reference clock supplied from the clock generator 11A. In this example, the pulses of the touch reference clock are supplied in synchronization with the horizontal synchronization signal Hsync, and thus, every time the touch detection operation in one display horizontal period 1H is performed, the count value of the second counter 11F increments by 1, thereby increasing like 1, 2, . . . , M−1, M. Because the pulse-like signals of the touch reference clock and the display reference clock according to the present embodiment are synchronized with each other, the count value of the first counter 11E and that of the second counter 11F increase at substantially the same timing.

As illustrated in FIG. 16, when the touch detection operation in one detection block detection period 1T is sequentially performed, and the count value of the second counter 11F reaches M, the touch panel controller 11D ends the detection surface touch detection period 1Ft based on the information received from the second counter 11F. The touch panel controller 11D then resets the count value of the second counter 11F. Subsequently, the next detection surface touch detection period 1Ft is started. The count value M in the detection surface touch detection period 1Ft measured by the second counter 11F is set to be larger than the count value N in the frame display period 1Fd measured by the first counter 11E.

As illustrated in FIG. 16, in the display device with a touch detection function 1 according to the present embodiment, the detection surface touch detection period 1Ft is set to be longer than the frame display period 1Fd. The detection surface touch detection period 1Ft is twice as long as the frame display period 1Fd, for example. When the detection surface touch detection period 1Ft is ended, the display panel controller 11C supplies the reset signal Vreset to the touch panel controller 11D at time $t_2$, thereby resetting the count value of the first counter 11E and that of the second counter 11F. The display panel controller 11C supplies the vertical synchronization signal Vsync to the gate driver 12 at time $t_2$, thereby starting the next third frame display period 1Fd. The touch panel controller 11D also supplies the vertical synchronization signal Vsync to the drive electrode driver 14 and the touch detector 40 at the same time $t_2$, thereby starting the next second detection surface touch detection period 1Ft.

Specifically, the display device with a touch detection function 1 simultaneously resets the count value of the first counter 11E and that of the second counter 11F based on the reset signal Vreset. The display device with a touch detection function 1 simultaneously starts the third frame display period 1Fd and the second detection surface touch detection period 1Ft at time $t_2$ when the vertical synchronization signal Vsync is supplied. As described above, the display device with a touch detection function 1 according to the present embodiment has two frame display periods 1Fd in one detection surface touch detection period 1Ft and repeatedly performs the operations. The reset signal Vreset and the vertical synchronization signal Vsync are not necessarily supplied at the same time and may be supplied at different time.

As illustrated in FIG. 16, the first detection surface touch detection period 1Ft and the first frame display period 1Fd are simultaneously started at time $t_0$ based on the vertical synchronization signal Vsync. The second frame display period 1Fd is started at time $t_1$ in the first detection surface touch detection period 1Ft. In other words, the second frame display period 1Fd and those subsequent thereto may possibly be asynchronous with the detection surface touch detection period 1Ft and be started at time different from the time at which the detection surface touch detection period 1Ft is started. In this example, at start time (e.g., time $t_1$) of one frame display period 1Fd out of two frame display periods 1Fd, the touch panel controller 11D is supplied with neither the vertical synchronization signal Vsync nor the reset signal Vreset and continuously performs touch detection on one detection surface GS in the detection surface touch detection period 1Ft. At least one frame display period 1Fd out of the second frame display period 1Fd and those subsequent thereto is started at the same time (e.g., time $t_2$) as the time when the detection surface touch detection period 1Ft is started.

The frame display periods 1Fd are provided in a first cycle, and the detection surface touch detection periods 1Ft are provided in a second cycle different from the first cycle. The frequency of the second cycle is lower than that of the first cycle. The frequency of the first cycle according to the present embodiment is 120 hertz, and the frequency of the second cycle is 60 hertz, for example.

As described above, in the display device with a touch detection function 1 according to the present embodiment, the detection surface touch detection period 1Ft is set to be longer than the frame display period 1Fd. The display device with a touch detection function 1 thus can improve the flexibility of the detection surface touch detection period 1Ft and secure the detection block detection periods 1T for the respective detection blocks $A_k$. Even if the frequency of a first period including a plurality of frame display periods 1Fd is increased, for example, the display device with a touch detection function 1 can suppress reduction in the touch detection accuracy.

In a case where the display device with a touch detection function 1 is coupled to an AC power supply (not illustrated), noise (hereinafter, referred to as external noise) from the outside caused by the AC power supply, for example, may possibly be transmitted to the touch panel 30.

If the sampling frequency for the touch detection signals Vdet and the frequency of the external noise are close to each other, the signal-to-noise (S/N) ratio of the touch detection signals Vdet may possibly deteriorate, thereby reducing the touch detection accuracy. To address this, it is necessary to change the repetition frequency of the touch detection operation in the detection surface touch detection period 1Ft, thereby suppressing reduction in the touch detection accuracy caused by the external noise.

In the conventional technique, however, all the frame display periods 1Fd are started at the same time as the time when the detection surface touch detection periods 1Ft are started. In this case, the frequency of the detection surface touch detection period 1Ft is equal to or an integral multiple of the frequency of the frame display period 1Fd. If the external noise is transmitted, it is necessary to make the frequency of the detection surface touch detection period 1Ft higher than that of the frame display period 1Fd so as to keep the frequency of the detection surface touch detection period 1Ft away from that of the external noise. In this case, the length of the detection block detection periods 1T for the respective detection blocks $A_k$ is reduced. As a result, the S/N ratio of the touch detection signals Vdet may possibly deteriorate, thereby reducing the touch detection accuracy.

In the display device with a touch detection function 1 according to the present embodiment, the detection surface touch detection period 1Ft is set to be longer than the frame display period 1Fd. This setting can make the frequency of the second cycle including a plurality of detection surface touch detection periods 1Ft lower than that of the first cycle including a plurality of frame display periods 1Fd such that the frequency of the detection surface touch detection period 1Ft is different from that of the external noise. Consequently, the present embodiment can suppress reduction in the touch detection accuracy caused by the external noise. Furthermore, the present embodiment can secure the detection block detection periods 1T for the respective detection blocks $A_k$ and suppress reduction in the touch detection accuracy.

The count value M of the second counter 11F according to the present embodiment at the end of the detection surface touch detection period 1Ft is larger than the count value N of the first counter 11E at the end of the frame display period 1Fd. This setting can make the detection surface touch detection period 1Ft longer than the frame display period 1Fd. Even if the repetition frequency of the display operation in the frame display period 1Fd is increased, the present embodiment can secure the detection block detection periods 1T for the respective detection blocks $A_k$ and suppress reduction in the touch detection accuracy.

While the first counter 11E and the second counter 11F measure the number of pulses of the respective reference clock signals, the embodiment is not limited thereto. The first counter 11E, for example, may increase the count value at a timing when the gate driver 12 switches the scanning signal line GCL to be selected. The second counter 11F may increase the count value at a timing when the drive signal Vcom is supplied to the detection block $A_k$ or a timing when the drive electrode driver 14 switches the detection block $A_k$ to be selected.

The present embodiment may have a suspension period for suspending touch detection after the detection surface touch detection period 1Ft is ended and before the vertical synchronization signal Vsync is supplied.

Because the detection surface touch detection period 1Ft is longer than the frame display period 1Fd, the drive electrode COML corresponding to one horizontal line that performs the display operation is different from the drive electrode COML that performs the touch detection operation at predetermined time (e.g., time $t_1$ illustrated in FIG. 16). The drive electrode driver 14 supplies DC voltage signals serving as the display drive signals Vcomd to the drive electrodes COML not selected as the detection block $A_k$. The drive electrodes COML thus can apply a common potential to the sub-pixels SPix (refer to FIG. 7).

Second Embodiment

Figure 17:
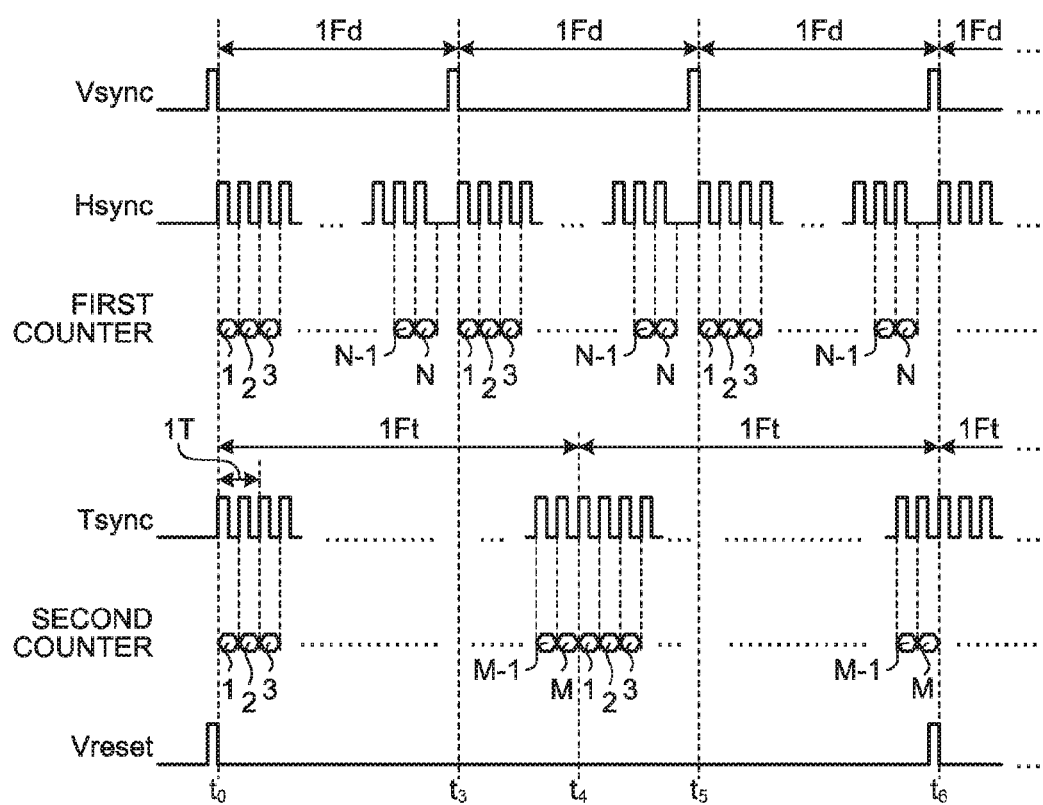
FIG. 17 is a diagram schematically illustrating a relation between the frame display periods and the detection surface touch detection periods according to a second embodiment.

FIG. 17 is a diagram schematically illustrating a relation between the frame display periods and the detection surface touch detection periods according to a second embodiment. In FIG. 16, the length of the detection surface touch detection period 1Ft is twice the length of the frame display period 1Fd, and two frame display periods 1Fd correspond to one detection surface touch detection period 1Ft, the present invention is not limited thereto. As illustrated in FIG. 17, the length of the detection surface touch detection period 1Ft may be 1.5 times the length of the frame display period 1Fd.

The first detection surface touch detection period 1Ft and the first frame display period 1Fd according to the present embodiment are simultaneously started at time $t_0$ when the vertical synchronization signal Vsync is supplied. The second frame display period 1Fd is started at time $t_3$ when the vertical synchronization signal Vsync is supplied. Subsequently, the second detection surface touch detection period 1Ft is started at time $t_4$ different from the start time of the frame display period 1Fd and is asynchronous with the vertical synchronization signal Vsync. In this case, when the count value of the second counter 11F reaches M in the first detection surface touch detection period 1Ft, the touch panel controller 11D ends the first detection surface touch detection period 1Ft. The touch panel controller 11D resets the count value of the second counter 11F and starts the second detection surface touch detection period 1Ft. As described above, the touch panel controller 11D starts the detection surface touch detection period 1Ft based on the information on the count value of the second counter 11F. Subsequently, the display panel controller 11C starts the third frame display period 1Fd at time $t_5$ based on the vertical synchronization signal Vsync and is asynchronous with the detection surface touch detection period 1Ft. In other words, the second and the third frame display periods 1Fd are started at time different from the time when the detection surface touch detection period 1Ft is started.

When the count value of the second counter 11F reaches M in the second detection surface touch detection period 1Ft, the touch panel controller 11D ends the second detection surface touch detection period 1Ft. The display panel controller 11C supplies the reset signal Vreset to the touch panel controller 11D, thereby resetting the count value of the first counter 11E and that of the second counter 11F. Subsequently, the fourth frame display period 1Fd and the third detection surface touch detection period 1Ft are simultaneously started at time $t_6$ based on the vertical synchronization signal Vsync.

As described above, in the display device with a touch detection function 1 according to the present embodiment, some of the frame display periods 1Fd are started at time different from the start time of the detection surface touch detection period 1Ft. Some of the detection surface touch detection periods 1Ft are started at time different from the start time of the frame display period 1Fd.

With this setting, the range of the length of the detection surface touch detection period 1Ft can be broadened with respect to the length of the frame display period 1Fd. As a result, the present embodiment can further improve the flexibility of the detection surface touch detection period 1Ft. Even if the repetition frequency of the display operation in the frame display period 1Fd is increased, the present embodiment can secure the detection block detection periods 1T for the respective detection blocks $A_k$ and suppress reduction in the touch detection accuracy.

While two detection surface touch detection periods 1Ft correspond to three frame display periods 1Fd in FIG. 17, the setting may be appropriately changed. Alternatively, three detection surface touch detection periods 1Ft may correspond to four frame display periods 1Fd, for example. In this case, if the frequency of the first cycle of the frame display period 1Fd is 120 hertz, the frequency of the detection surface touch detection period 1Ft is 90 hertz. To set the frequency of the detection surface touch detection period 1Ft to 45 hertz with respect to a frequency of the frame display period 1Fd of 120 hertz, three detection surface touch detection periods 1Ft may correspond to eight frame display periods 1Fd.

Third Embodiment

Figure 18:
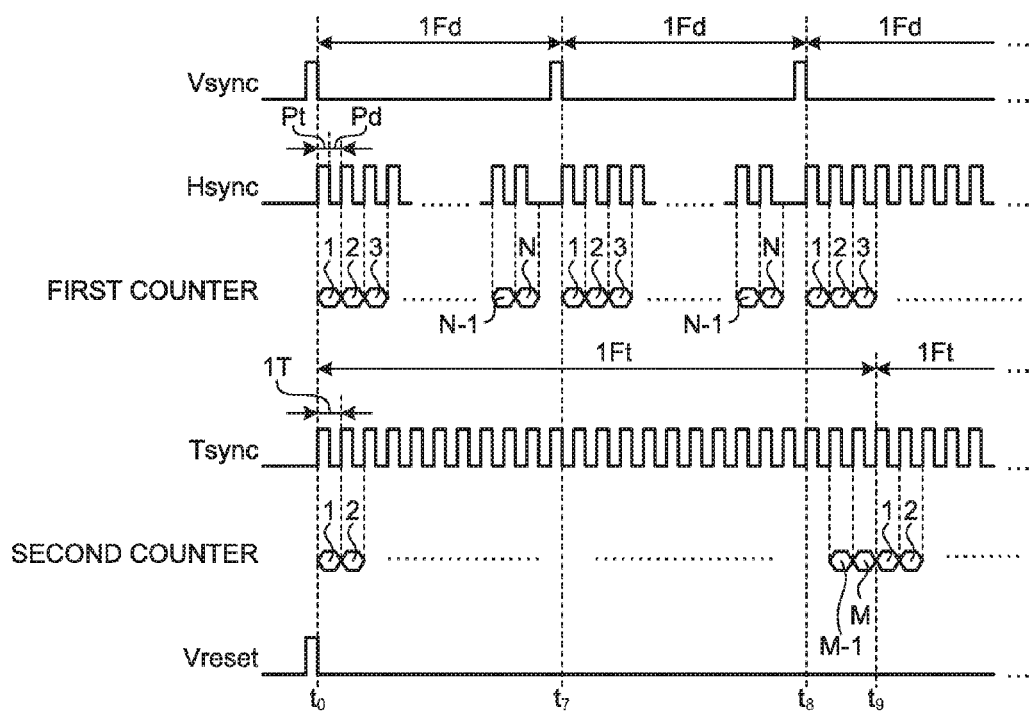
FIG. 18 is a diagram schematically illustrating a relation between the frame display periods and the detection surface touch detection periods according to a third embodiment.

FIG. 18 is a diagram schematically illustrating a relation between the frame display periods and the detection surface touch detection periods according to a third embodiment. The display device with a touch detection function 1 according to the present embodiment simultaneously starts the first detection surface touch detection period 1Ft and the first frame display period 1Fd at time $t_0$ when the vertical synchronization signal Vsync is supplied. The second detection surface touch detection period 1Ft and those subsequent thereto, however, are started asynchronously with the frame display period 1Fd at time different from time $t_7$ and time $t_8$ when the frame display period 1Fd is started. When the count value of the second counter 11F reaches M in the first detection surface touch detection period 1Ft, the touch panel controller 11D ends the first detection surface touch detection period 1Ft. The touch panel controller 11D resets the count value of the second counter 11F and starts the second detection surface touch detection period 1Ft at time $t_9$. As described above, the present embodiment starts the second detection surface touch detection period 1Ft and those subsequent thereto based on the information on the count value of the second counter 11F.

The touch panel controller 11D illustrated in FIG. 1 is supplied with the vertical synchronization signal Vsync and the reset signal Vreset from the display panel controller 11C at time $t_0$ when the first detection surface touch detection period 1Ft is started. The touch panel controller 11D is supplied with no vertical synchronization signal Vsync at time $t_7$ and time $t_8$ when the frame display period 1Fd is started after time $t_0$. The touch panel controller 11D is supplied with neither vertical synchronization signal Vsync nor reset signal Vreset at time $t_9$ when the second detection surface touch detection period 1Ft is started. In other words, the touch detection operations in the second detection surface touch detection period 1Ft and those subsequent thereto may be performed independently of the frame display periods 1Fd without being restricted by the vertical synchronization signal Vsync.

In present embodiment, the frequency at which the touch detection operation is repeatedly performed in the detection surface touch detection period 1Ft can be set independent of the frame display period 1Fd. As a result, the present embodiment can further improve the flexibility of the detection surface touch detection period 1Ft. Even if the repetition frequency of the display operation in the frame display period 1Fd is increased, for example, the present embodiment can secure the detection block detection periods 1T for the respective detection blocks $A_k$ and suppress reduction in the touch detection accuracy.

Fourth Embodiment

Figure 19:
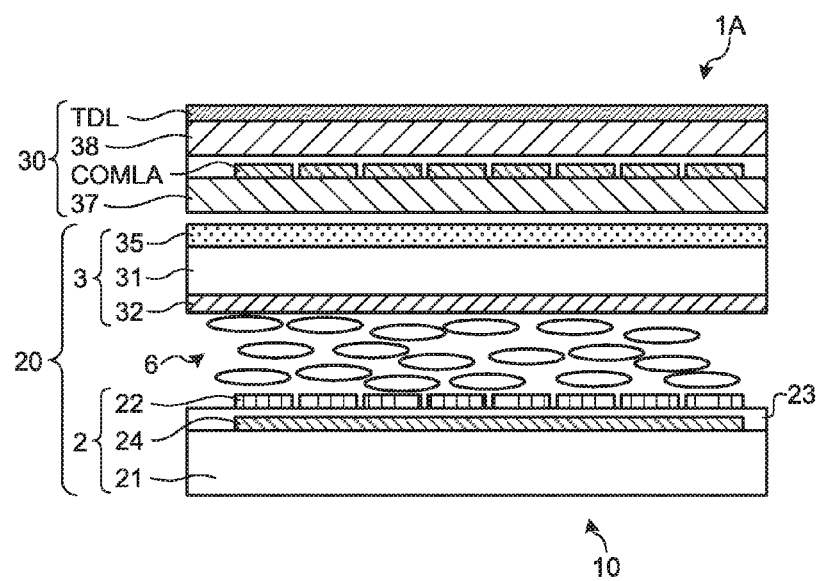
FIG. 19 is a sectional view of a schematic sectional structure of the display device with a touch detection function according to a fourth embodiment.

FIG. 19 is a sectional view of a schematic sectional structure of the display device with a touch detection function according to a fourth embodiment. A display device with a touch detection function 1A according to the present embodiment is what is called an on-cell display device in which the capacitance touch panel 30 is mounted on the surface of the display panel 20.

In the display device with a touch detection function according to the first to the third embodiments, the touch panel 30 and the display panel 20 are integrated. The drive electrodes COML function as common electrodes that apply a common potential to a plurality of sub-pixels SPix in the display panel 20 and function as drive electrodes used in touch detection in the touch panel 30. By contrast, as illustrated in FIG. 19, the display panel 20 according to the present embodiment includes common electrodes 24 instead of the drive electrodes COML (refer to FIG. 7) above the first substrate 21. The common electrodes 24 face the pixel electrodes 22 in the direction perpendicular to the surface of the first substrate 21. The common electrodes 24 apply a common potential to the sub-pixels SPix but are not supplied with the drive signals Vcom for a touch detection operation. The common electrodes 24 may be successively provided on a plane parallel to the surface of the first substrate 21.

The touch panel 30 includes drive electrodes COMLA on a lower substrate 37 and the touch detection electrodes TDL on an upper substrate 38. The drive electrodes COMLA are supplied with the drive signals Vcom for detecting touch input. The display device with a touch detection function 1A detects the position of touch input based on mutual capacitance between the drive electrodes COMLA and the touch detection electrodes TDL.

The touch panel 30 may be fixed above the display panel 20 with a gap interposed therebetween or be bonded to the upper surface of the display panel 20 with an adhesive layer (not illustrated) interposed therebetween. The lower substrate 37 of the touch panel 30 and the second substrate 31 of the display panel 20 may be a single substrate. In other words, the drive electrodes COMLA may be provided on the upper surface of the second substrate 31, and the upper substrate 38 provided with the touch detection electrodes TDL may be bonded on the second substrate 31.

While the drive electrodes COMLA and the touch detection electrodes TDL are provided on different substrates, the embodiment is not limited thereto. The drive electrodes COMLA and the touch detection electrodes TDL, for example, may be provided as a single layer on a single substrate with an insulating layer interposed therebetween. In a case where the drive electrodes COMLA and the touch detection electrodes TDL are provided as a single layer, bridge electrodes may be provided such that the drive electrodes COMLA and the touch detection electrodes TDL intersect with each other like the first embodiment. First one of the drive electrodes COMLA and the touch detection electrodes TDL may extend in one direction, and second one thereof may be arranged in parallel so as to face the first one.

If noise of display drive is transmitted from the display panel 20 to the touch panel 30, for example, the display device with a touch detection function 1A including the touch panel 30 mounted on the surface of the display panel 20 illustrated in FIG. 19 may also perform the display operation of the display panel 20 and the touch detection operation of the touch panel 30 in a time-division manner. Like the embodiments illustrated in FIGS. 16 to 18, the display device with a touch detection function 1A can set the detection surface touch detection period 1Ft longer than the frame display period 1Fd. The display device with a touch detection function 1A can make the frequency at which the touch detection operation is repeatedly performed in the detection surface touch detection period 1Ft lower than the frequency at which the display operation is repeatedly performed in the frame display period 1Fd. Consequently, the present embodiment can change the detection surface touch detection period 1Ft such that the frequency of the detection surface touch detection period 1Ft is different from that of the external noise, thereby suppressing an effect of the external noise. Even if the frequency of the first cycle including a plurality of frame display periods 1Fd is increased, the present embodiment can secure the detection block detection periods 1T for the respective detection blocks $A_k$ and suppress reduction in the touch detection accuracy.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the technical scope of the invention.

The liquid crystal layer 6 of the display panel 20 according to the embodiments above, for example, includes liquid crystals in a lateral electric-field mode, such as the IPS mode including the FFS mode. Alternatively, the display panel 20 may include liquid crystals in various modes, such as the twisted nematic (TN), the vertical alignment (VA), and the electric-field controlled birefringence (ECB) modes. The configuration in this case is different from that illustrated in FIG. 6. The drive electrodes COML are provided on the counter substrate 3 side, and the liquid crystal layer 6 is arranged in a manner sandwiched between the pixel electrodes 22 and the drive electrodes COML in the direction perpendicular to the surface of the first substrate 21.

What is claimed is:

1. A display device with a touch detection function comprising:
   a first electrode configured to be supplied with a display drive signal;
   a plurality of second electrodes configured to be sequentially supplied with a pixel signal;
   a display functional layer configured to perform a display operation based on the display drive signal and the pixel signal;

a plurality of touch detection electrodes configured to sequentially output a touch detection signal and configured to perform a touch detection operation; and a first counter and a second counter configured to measure a number of pulses of a reference clock signal, wherein each of frame display periods is for performing the display operation based on image information on one frame, and includes a plurality of partial display periods, each of frame detection periods is from when touch detection is started to when the detection is completed on an entire detection surface, and includes a plurality of partial detection periods, wherein each partial display period starts after an end of each partial detection period in each frame display period, one of the partial display periods and one of the partial detection periods are performed alternately, the frame display periods include a first frame display period and a second frame display period that follows an end of the first frame display period, the frame detection periods include a first frame detection period and a second frame detection period that follows the first frame detection period, the first frame display period and the first frame detection period are started based on a display synchronization signal, the second frame display period starts before an end of the first frame detection period, the second frame detection period starts before an end of the second frame display period, the first counter stops counting at a predetermined number before the end of the first frame display period and has a delay between a final count in the first frame display period and a first count in the second display frame, and the second counter continues counting during the delay after the first counter stops counting.

2. The display device with a touch detection function according to claim 1, wherein the second frame detection period is started upon a timing different from a start of each of the frame display periods.

3. The display device with a touch detection function according to claim 1, wherein the frame display periods further include a third frame display period that follows the second frame display period, and the third frame display period starts upon a start of one of the frame detection periods.

4. The display device with a touch detection function according to claim 1, wherein
the frame display periods are provided in a first cycle, and the frame detection periods are provided in a second cycle different from the first cycle, and
a frequency of the second cycle is lower than a frequency of the first cycle.

5. The display device with a touch detection function according to claim 1, wherein
the first electrode is configured to apply a common potential to the display functional layer in the display operation and is configured to be supplied with a touch drive signal in the touch detection operation, and
the touch detection electrodes are configured to output the touch detection signal based on the touch drive signal supplied to the drive electrode.

6. The display device with a touch detection function according to claim 1, wherein the first electrode functions as the touch detection electrodes that sequentially output the touch detection signal and perform the touch detection operation.

7. The display device with a touch detection function according to claim 1,
wherein
each of the frame display periods includes the partial display periods including a first partial display period from which the each of the frame display periods is started,
each of the frame detection periods includes the partial detection periods including a first partial detection period from which the each of the frame display periods is started,
the first partial display period of the first frame display period and the first partial detection period of the first frame detection period are performed successively, and
the first partial display period of the second frame display period and the first partial detection period of the second frame detection period are performed discontinuously.

8. The display device with a touch detection function according to claim 1,
wherein
each of the frame display periods includes a first number of the partial display periods,
each of the frame detection periods includes a second number of the partial detection periods, and
the second number is not an integral multiple of the first number.

9. The display device with a touch detection function according to claim 1,
wherein
each of the frame display periods includes a first number of the partial display periods,
each of the frame detection periods includes a second number of the partial detection periods, and
the second number is greater than the first number and less than twice the first number.

10. A display device with a touch detection function comprising:
a first electrode configured to be supplied with a display drive signal;
a plurality of second electrodes configured to be sequentially supplied with a pixel signal;
a display functional layer configured to perform a display operation based on the pixel signal and the display drive signal;
a plurality of touch detection electrodes configured to sequentially output a touch detection signal and configured to perform a touch detection operation;
a clock generator configured to generate a reference clock signal serving as a reference for star time of the display operation and the touch detection operation; and
a first counter and a second counter configured to measure a number of pulses of the reference clock signal, wherein
each of frame display periods is for performing the display operation based on image information on one frame, and includes a plurality of partial display periods,
each of frame detection periods is from when touch detection is started to when the detection is completed on an entire detection surface, and includes a plurality of partial detection periods, wherein each partial display period starts after an end of each partial detection period in each frame display period,
one of the partial display periods and one of the partial detection periods are performed alternately, the frame display periods include a first frame display period and a second frame display period that follows an end of the first frame display period, the frame detection periods include a first frame detection period and a second frame detection period that follows the first frame detection period, the first frame display period and the first frame detection period are started based on a display synchronization signal, the second frame display period starts before an end of the first frame detection period, the second frame detection period starts before an end of the second frame display period, the first counter is configured to measure the number of pulses of the reference clock signal at least in one frame display period, the second counter is configured to measure the number of pulses of the reference clock signal at least in one frame detection period, a count value of the second counter at least in the frame detection period is larger than a count value of the first counter at least in one frame display period, the first counter stops counting at a predetermined number before the end of the first frame display period and has a delay between a final count in the first frame display period and a first count in the second display frame, and the second counter continues counting during the delay after the first counter stops counting.

11. The display device with a touch detection function according to claim 10, wherein the count value of the second counter is reset upon a timing of starting each of the frame display period.

12. The display device with a touch detection function according to claim 10, wherein the second frame detection period is started based on information on the count value of the second counter.

13. The display device with a touch detection function according to claim 10, wherein each of the frame display periods is started based on the display synchronization signal, and the count value of the first counter is reset at a timing when the display synchronization signal is supplied.

14. A display method performed by a display device with a touch detection function, the display device with the touch detection function comprising:

a first electrode configured to be supplied with a display drive signal;

a plurality of second electrodes configured to be sequentially supplied with a pixel signal;

a display functional layer configured to perform a display operation based on the display drive signal and the pixel signal;

a plurality of touch detection electrodes configured to sequentially output a touch detection signal and configured to perform a touch detection operation; and a first counter and a second counter configured to measure a number of pulses of a reference clock signal, wherein each of frame display periods is for performing the display operation based on image information on one frame, and includes a plurality of partial display periods, each of frame detection periods is from when touch detection is started to when the detection is completed on an entire detection surface, and includes a plurality of partial detection periods, wherein each partial display period starts after an end of each partial detection period in each frame display period, one of the partial display periods and one of the partial detection periods are performed alternately, the frame display periods include a first frame display period and a second frame display period that follows an end of the first frame display period, the frame detection periods include a first frame detection period and a second frame detection period that follows the first frame detection period, the first frame display period and the first frame detection period are started based on a display synchronization signal, the second frame display period starts before an end of the first frame detection period, the second frame detection period starts before an end of the second frame display period, the first counter stops counting at a predetermined number before the end of the first frame display period and has a delay between a final count in the first frame display period and a first count in the second display frame, and the second counter continues counting during the delay after the first counter stops counting.

* * * * *